US012746537B2

(12) United States Patent
Roy

(10) Patent No.: US 12,746,537 B2
(45) Date of Patent: Sep. 29, 2026

(54) INTERNAL DIENE COMPOUNDS AND THEIR PT COMPLEXES FOR CATALYZED REACTIONS INCLUDING HYDROSILYLATION

(71) Applicant: Aroop Kumar Roy, Mechanicville, NY (US)

(72) Inventor: Aroop Kumar Roy, Mechanicville, NY (US)

( * ) Notice: Subject to any disclaimer, the term of this patent is extended or adjusted under 35 U.S.C. 154(b) by 466 days.

(21) Appl. No.: 18/469,546

(22) Filed: Sep. 18, 2023

(65) Prior Publication Data

US 2024/0009659 A1 Jan. 11, 2024

Related U.S. Application Data

(63) Continuation-in-part of application No. PCT/US2023/015003, filed on Mar. 10, 2023.

(60) Provisional application No. 63/322,739, filed on Mar. 23, 2022.

(51) Int. Cl.
*B01J 31/22* (2006.01)
*C07F 7/21* (2006.01)

(52) U.S. Cl.
CPC ............ *B01J 31/2295* (2013.01); *C07F 7/21* (2013.01); *B01J 2231/32* (2013.01); *B01J 2531/004* (2013.01); *B01J 2531/828* (2013.01)

(58) Field of Classification Search
CPC ................ B01J 31/2295; B01J 2231/32; B01J 2531/004; B01J 2531/828; C07F 7/21; C07F 7/081; C07F 7/0838; C07F 15/006; C07F 15/0086
See application file for complete search history.

(56) References Cited

U.S. PATENT DOCUMENTS 3,159,601 A 12/1964 Ashby
3,220,972 A 11/1965 Lamoreaux
3,419,593 A 12/1968 Willing
3,715,334 A 2/1973 Karstedt
3,775,452 A 11/1973 Karstedt
4,593,084 A * 6/1986 Chandra ............ C07F 15/0086 556/14
5,175,325 A 12/1992 Brown et al.
5,424,470 A 6/1995 Bank et al.
5,449,802 A 9/1995 Bank et al.
5,563,287 A 10/1996 Roy
5,567,848 A 10/1996 Roy
6,359,098 B1 3/2002 Fehn et al.
6,605,734 B2 8/2003 Roy et al.
6,803,440 B2 10/2004 Marko et al.
6,806,440 B2 10/2004 Sun et al.
8,524,262 B2 9/2013 Roy et al.
9,434,749 B2 9/2016 Roy et al.
10,000,611 B2 6/2018 Roy et al.
10,047,108 B2 8/2018 Boyer et al.
10,513,584 B2 12/2019 Roy et al.
10,597,496 B2 3/2020 Boyer et al.
2009/0127669 A1 5/2009 Yamamoto et al.
2009/0171058 A1 7/2009 Kilgour

FOREIGN PATENT DOCUMENTS

EP 0979837 A2 2/2000

OTHER PUBLICATIONS

Sore et al. (Vinyldisiloxanes: their synthesis, cross coupling and applications, Organic and Biomolecular Chemistry, 2011) (Year: 2011).*
International Search Report for International Application No. PCT/US2023/015003, mailed Nov. 15, 2023 (3 pp).
Keulen et al. "Thermal stability of hexamethyldisiloxane and octamethyltrisiloxane", Energy, 2018. vol. 165, pp. 868-876, especially: p. 2, para 2, MDM (Octamethyltrisiloxane, C8H24O2Si3); p. 21, para 3; p. 26, Table 5.
PubChem-SID-24853996, Modify Date: Mar. 14, 2018 (Mar. 14, 2018), p. 2, figure.
Speier et al. "The addition of silicon hydrides to olefinic double bonds. Part II. The use of group VIII metal catalysts." Journal of the American Chemical Society 79.4 (1957): 974-979.
Berthon-Gelloz, Guillaume, et al. "Synthetic and structural studies of NHC-Pt (dvtms) complexes and their application as alkene hydrosilylation catalysts (NHC= N-heterocyclic carbene, dvtms= divinyltetramethylsiloxane)." Journal of organometallic chemistry 690.24-25 (2005): 6156-6168.
Denmark, Scott E., and Zhigang Wang. "Highly stereoselective hydrocarbation of terminal alkynes via Pt-catalyzed hydrosilylation/Pd-catalyzed cross-coupling reactions." Organic Letters 3.7 (2001): 1073-1076.
Wu, Wei, et al. "Tri (t-butyl) phosphine-assisted selective hydrosilylation of terminal alkynes." Chinese Chemical Letters 21.3 (2010): 312-316.

(Continued)

*Primary Examiner* — Anthony J Zimmer
*Assistant Examiner* — Logan Laclair
(74) *Attorney, Agent, or Firm* — Wiggin and Dana LLP

(57) ABSTRACT

Internal dienes (including supported versions) and their Periodic Groups IX, X and Pt Group Metal Complexes as catalysts for hydrosilylation/coupling reactions. A process for the hydrosilylation of an unsaturated compound comprising reacting (a) a silyl or siloxy hydride with (b) an unsaturated compound in the presence of (c) one or more platinum complex containing said internal dienic ligand or (d) a platinum compound and one or more said internal dienic ligand additive. For Ru, Os, Co, Rh, Ir, Ni, or Pd, catalyzed processes such as C—C/C—N or C—O coupling comprising reacting (a) an aromatic halide/vinyl halide/an aromatic triflate with (b) a primary/secondary amine/amide, an alcohol/aryl boronic acid/aryl boronate/vinyl halide or an activated olefin in the presence of (c) a Group IX or X or Pt Group metal complex containing said dienic ligand(s) or (d) a suitable compound of these metals and of one or more said internal dienic ligand additive.

24 Claims, No Drawings

(56) References Cited

OTHER PUBLICATIONS

Sore, Hannah F., et al. "Vinyldisiloxanes: their synthesis, cross coupling and applications." Organic & Biomolecular Chemistry 9.2 (2011): 504-515.
Bigler, Raphael, et al. "Synthesis of Biaryl Phosphine Palladium (0) Precatalysts." Organometallics 40.15 (2021): 2384-2388.
Andreu, Mario Gómez, Alexander Zapf, and Matthias Beller. "Molecularly defined palladium (0) monophosphine complexes as catalysts for efficient cross-coupling of aryl chlorides and phenylboronic acid1." Chemical Communications 24 (2000): 2475-2476.
Roy, Aroop K., and Richard B. Taylor. "The first alkene-platinum-silyl complexes: Lifting the hydrosilation mechanism shroud with long-lived precatalytic intermediates and true Pt catalysts." Journal of the American Chemical Society 124.32 (2002): 9510-9524.
Roy, Aroop K. "A review of recent progress in catalyzed homogeneous hydrosilation (hydrosilylation)." Advances in organometallic chemistry 55 (2007): 1-59.
Krause, Jochen, et al. "1, 6-diene complexes of palladium (0) and platinum (0): highly reactive sources for the naked metals and [L-M0] fragments." Journal of the American Chemical Society 121.42 (1999): 9807-9823.
Maciejewski, H., B. Marciniec, and I. Kownacki. "Catalysis of hydrosilylation: Part XXXIV. High catalytic efficiency of the nickel equivalent of Karstedt catalyst [{Ni (η-CH2=CHSiMe2) 2O} 2 {μ-(η-CH2=CHSiMe2) 2O}]." Journal of Organometallic Chemistry 597.1-2 (2000): 175-181.
Berthon-Gelloz, Guillaume, et al. "Expedient, direct synthesis of (L) Pt (0)(1, 6-diene) complexes from H2PtCl6." Organometallics 26.23 (2007): 5731-5734.
Steffanut, Pascal, et al. "Efficient Homogeneous Hydrosilylation of Olefins by Use of Complexes of Pt0 with Selected Electron-Deficient Olefins as Ligands." Chemistry—A European Journal 4.10 (1998): 2008-2017.
Troegel, Dennis, and Jürgen Stohrer. "Recent advances and actual challenges in late transition metal catalyzed hydrosilylation of olefins from an industrial point of view." Coordination Chemistry Reviews 255.13-14 (2011): 1440-1459.
Nair, Reji N., et al. "Unexpected synthesis and structural characterization of Pt (II) Cl2-1, 5-hexadiene from reaction of allyl chloride and K2PtCI4." Inorganica Chimica Acta 364.1 (2010): 272-274.
Marciniec, Bogdan, ed. Comprehensive handbook on hydrosilylation. Elsevier, 2013.
Marciniec, Bogdan. "Catalysis by transition metal complexes of alkene silylation-recent progress and mechanistic implications." Coordination Chemistry Reviews 249.21-22 (2005): 2374-2390.
Olivares, Astrid M., and Daniel J. Weix. "Multimetallic Ni-and Pd-catalyzed cross-electrophile coupling to form highly substituted 1, 3-dienes." Journal of the American Chemical Society 140.7 (2018): 2446-2449.
Cannes, C., et al. "Nickel-catalyzed electrochemical couplings of vinyl halides: synthetic and stereochemical aspects." The Journal of Organic Chemistry 65.15 (2000): 4575-4583.
Intemann, Julia, et al. "Calcium Hydride Catalyzed Highly 1, 2-Selective Pyridine Hydrosilylation." Chemistry—A European Journal 21.32 (2015): 11452-11461.

* cited by examiner

INTERNAL DIENE COMPOUNDS AND THEIR PT COMPLEXES FOR CATALYZED REACTIONS INCLUDING HYDROSILYLATION

CROSS-REFERENCE TO RELATED APPLICATIONS

This application is a continuation-in-part of International Patent Application Number PCT/US2023/015003, filed Mar. 10, 2023, claiming priority to U.S. Provisional Patent Application No. 63/322,739, filed Mar. 23, 2022, which are hereby incorporated by reference herein in their entirety.

BACKGROUND OF THE INVENTION

1. Field of the Invention

The present invention generally relates to discrete or in-situ dynamic complexes of periodic Groups IX, X and Pt Group metals with internal dienes based on siloxanes, hydrocarbon ethers or internally unsaturated hydrocarbons, and/or common compounds/complexes of these metals in the presence of the said internal dienes as additives, and their use in catalyzed reactions including hydrosilylation or C—C/C—N/C—O coupling. The preferred metal is platinum and the preferred catalyzed reaction is hydrosilylation.

2. Brief Description of the Art

The hydrosilylation reaction is of immense value both to the chemical industry and commerce, as well as to modern scientific research and development. It is well established that platinum metal, compounds or complexes are overwhelmingly the catalysts of choice for this extremely valuable reaction. Nevertheless, as with all chemistry, there are many drawbacks both minor and more serious with Pt catalysts. Examples of such shortcomings are the high price of the rare metal Pt (tightly sourced only from a few countries), the need for higher loadings (often to compensate for active catalyst loss to metal aggregation during the hydrosilylation reaction itself), and several common side reactions leading to major substrate/reactant loss and consequent by-product disposal expenses. For hydrosilylation, the bulk of Pt catalysts used goes towards achieving cross-linking/cure for elastomeric materials, where the catalyst is lost to the final product, meaning the Pt is not realistically recoverable or recyclable currently in most cases. In recognition of the many drawbacks of the common molecular and metallic Pt catalysts such as Speier's Catalyst (J. Am. Chem. Soc. 1957, 79, 974), Karstedt's Catalyst (U.S. Pat. Nos. 3,775,452; 3,715,334), Ashby's Catalyst (U.S. Pat. No. 3,159,601), and Lamoreaux's Catalyst (U.S. Pat. No. 3,220, 972), and various types and forms of supported Pt, over the last 30 or so years newer catalyst and additive technologies have emerged. For example, the use of accelerator molecules with $H_2PtCl_6$ type compounds led to faster and more complete reactions with various substrates and silanes (Bank, et al U.S. Pat. Nos. 5,424,470, 5,449,802); use of cyclic olefins and dienes as additives or incorporated into Pt(II) complexes, both known and novel, and various siloxane based Pt catalysts have ushered in a new era of stabler homogeneous Pt catalysts that in one or more advantages help reduce Pt consumption, improve yields, reduce color and exhibit overall performance improvements (U.S. Pat. Nos. 5,563,287, 5,567,848, 6,359,098, 6,605,734, 10,000,611, 5,175,325; 2,009,017 and European Patent No. 0979837); the introduction of novel N-heterocyclic carbene (NHC) complexes of Pt appears to have addressed some shortcomings for both cure and small molecule hydrosilylation chemistry (U.S. Pat. No. 6,803,440, Marko, et al., J. Organomet Chem. 2005, 690, 6156; Chem. Eur. J. 2015, 21, 1), combining some of the characteristics of both Speier's and Karstedt's catalysts.

Despite these gains, significant challenges remain in industry, especially in the major application of siloxane cure chemistry (which by far is the largest consumer of Pt amongst silane and silicone chemistries) to improve catalysis with Karstedt-type Pt catalysts at least. Further, Karstedt's type catalysts are also used in large quantities for the hydrosilylation of small molecules and lower molecular weight polymers and where organic compatibility is critical or at least highly desirable. Additionally, extraction of Pt metals from the few Pt-source mines in the world has been reported to cause very high levels of pollution, including polluted rivers and atmospheric release of large quantities of $SO_2$ from sulfide ores. This is a contributor to climate change which has already reached crisis status globally. More efficient uses of Pt, Pd, Ni, and the Pt metals (albeit, for all mined elements and compounds) would be highly desirable for humanity. Thus, there is still a clear need for more efficient Pt catalysts that overcome unmet catalysis needs of the silicone industry as well as those of the petrochemical industry that uses hydrosilylation. Moreover, Pt Group metals, and close others in Groups IX and X form catalysts for a plethora of chemical transformations, such as addition, polymerization and coupling reactions with Pd-phosphine complexes for example (Suzuki-Miyaura and Buchwald-Hartwig couplings), that are highly valued in fine and specialty chemicals, pharmaceutical intermediates and other important fields of commerce in the chemical world. Better catalysts can help increase production, reduce cost, improve processes and reduce industrial chemical waste, all of which are beneficial for the environment.

SUMMARY OF THE INVENTION

The present invention, which targets the ongoing improvement needs, constitutes compounds that contain certain groups of internal dienes (except for nonconjugated cyclodienes such as 1,5-cyclooctadiene and internal dienes based on disiloxanes), their discrete or dynamic, in-situ complexes with periodic Groups IX, X and Pt Group metals and the use of these complexes for synthetic reactions, including hydrosilylation or C—C/C—N/C—O coupling. The preferred metal is Pt and the preferred catalyzed reaction is hydrosilylation. The preference of metals for coupling reactions are, in the order, Pd, Rh, Ru, Ni, Co, Ir and Os. The internal olefinic dienes of this invention are represented by Formulas I-VII $$M_aM'_bD_cD'_dT_eT'_fQ_g \quad \text{I}$$

$$R^1\sim\sim CR^2{=}CR^3{-}E{-}X{-}E{-}CR^4{=}CR^5\sim\sim R^6 \quad \text{II}$$

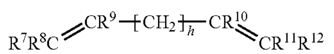
III $$[\{OSi(R^1CR^2{=}CR^3)R\}_j\{OSiR_2\}_k] \quad \text{IV}$$

-continued $$R^1CR^2{=}CR^3SiR^{13}R^{14}[OSi(R^1CR^2{=}CR^3)R]_x[OSiR_2]_yOSiR^{13}R^{14}CR^4{=}CR^5R^6$$ V $$Me_3Si[OSi(R^1CR^2{=}CR^3)R]_x[OSiR_2]_yOSiMe_3$$ VI $$[\{OSi(R^1CR^2{=}CR^3)\}_l\{OSiR_2\}_m\{OSiR_3\}_n]_p$$ VII where M, D, T, and Q have their usual meaning in siloxane nomenclature, i.e., an "M" group represents a monofunctional group of formula $R_3SiO_{1/2}$, a "D" group represents a difunctional group of formula $R_2SiO_{2/2}$, a "T" group represents a trifunctional group of formula $RSiO_{3/2}$, and a "Q" group represents a tetrafunctional group of formula $SiO_{4/2}$, and where each R typically independently represents a monovalent hydrocarbyl group. The most common representation of the hydrocarbyl group on Si is methyl (Me/$CH_3$), i.e., MM represents hexamethyldisiloxane, e.g., in siloxane nomenclature. It is intended that alkyl and/or aryl groups attached to Si in the M, M', D, D', T, and T' units of I independently contain 1-40 carbon atoms per group, preferably 1-20 carbon atoms per group and may independently contain heteroatoms such as N, O, halogen, Si, or P. The substituent "halogen" is intended to encompass F, Cl, Br, and I. Further, it is intended that the M', D', and T' units in I contain an internal olefinic group of this invention, such that there are at least two such groups per molecule that are preferably on adjacent siloxane units (Si—O—Si) to provide the envisaged internal dienic structure that would be capable of preferably forming chelate complexes with Pt or Periodic Group IX, X and Pt Group metals. a≥0, b≥0, c≥0, d≥0, e≥0, f≥0, g≥0, but not all zero at once. Values for a, b, c, d, e, f and g are such that I can represent a disiloxane, cyclic siloxane, linear or branched siloxane oligomer, linear or branched siloxane polymer, siloxane cage, siloxane resin, and hybrids of these as are known in silicone chemistry. Molecular weights could then vary from that of a dimer (disiloxane) up to high molecular weight structures of about 1,000,000 Dalton, based on practical synthesis and use considerations. The simplest of the envisaged internal dienes could be represented by Formulas II and III. Some specific and/or preferred internal diene containing siloxanes and hydrocarbon ethers and hydrocarbons and predicted Pt complexes as discrete species are described below.

The use of Pt complexes of the above types of internal dienes for hydrosilylation is expected to lead to process and product improvements in potentially multiple ways, including but not limited to Pt use level reduction, steady reactions, color reduction, by product reduction, process improvements, access to newer products, faster cure, etc. The high lability of metal-olefin bonds, but better binding of dienic ligands vs olefins makes dienes uniquely attractive for metal complex catalyzed reactions for a number of reasons, including ease of substrate exchange at the metal center, polar or nonpolar substrate and solvent compatibility, faster reaction, protection of the active metal center from aggregation, etc. Additionally, zero-valent metal complexes containing volatile or weak olefins may be beneficial for metal vapor deposition applications. While nonhydrosilylatable cyclodienes such as 1,5-cyclooctadiene bind well with higher oxidation states of Pt and many other transition metals, and sym-divinyldisiloxanes bind well with Pt(0) and some other zero valent transition metals, there is a technology gap in the availability of classes of dienic ligands that do not hydrosilylate or are not consumed/transformed readily, and yet bind with these metals across zero as well as higher oxidation states to provide nimble complexes that have reaction rate, compatibility and other advantages for many catalyzed reactions such as hydrosilylation and C—C/C—N/C—O type coupling. The instant invention targets to fill this gap with classes of internal dienic ligands and their complexes for hydrosilylation with Pt and other reactions using the non-Pt metals included herein using complexes of those metals in a range of oxidation states. The advantages that are noted above for Pt suggest that the same or similar types of advantages can be achieved for the other metals of this invention. These are described in more detail below.

DETAILED DESCRIPTION OF THE INVENTION

The present invention envisages compounds/molecules/polymers/inorganic supports that contain internal olefinic dienes (except for non-conjugated cyclic dienes such as 1,5-cyclooctadiene, norbornadiene and internal dienes based on disiloxanes in their direct molecular form), their stable, metastable or dynamic, in-situ complexes with Periodic Groups IX, X and Pt Group metals in various oxidation states and the use of such complexes for catalyzed synthetic reactions, including hydrosilylation and C—C/C—N/C—O coupling reactions. The preferred metal is Pt and the preferred catalyzed reaction is hydrosilylation. The internal olefinic dienes of this invention and their Pt complexes are represented by Formulas I-XVII and heterogeneous supported versions as well. Expected complexes of the other metals with the internal dienes are represented by the approximate Formula XVIII.

$$M_aM'_bD_cD'_dT_eT'_fQ_g$$ I where M, D, T, and Q have their usual meaning in siloxane nomenclature, i.e., an "M" group represents a monofunctional group of formula $R_3SiO_{1/2}$, a "D" group represents a difunctional group of formula $R_2SiO_{2/2}$, a "T" group represents a trifunctional group of formula $RSiO_{3/2}$, and a "Q" group represents a tetrafunctional group of formula $SiO_{4/2}$, and where each R typically independently represents a monovalent hydrocarbyl group. The most common representation of a hydrocarbyl group on Si is methyl (Me/$CH_3$), i.e., MM represents hexamethyldisiloxane, e.g., in siloxane nomenclature convention. It is intended that alkyl and/or aryl groups attached to Si in the M, M', D, D', T and T' units of I independently contain 1-40 carbon atoms per group, preferably 1-20 carbon atoms per group and may contain hetero atoms such as N, O, halogen, Si, etc. Further, it is intended that the M', D', and T' units in I contain at least some internal olefinic group of this invention, such that there are, most preferably, at least two such groups per molecule that are on adjacent Si atoms to provide the envisaged internal dienic structure that would be capable of forming chelate complexes with Pt. a≥0, b≥0, c≥0, d≥0, e≥0, f≥0, g≥0, but not all zero at once. Values for a, b, c, d, e, f and g are such that I can represent a disiloxane, cyclic siloxane, linear or branched siloxane oligomer, linear or branched siloxane polymer, siloxane cage, siloxane resin, and hybrids of these as are known in silicone chemistry. Molecular weights could then vary from that of a dimer (disiloxane) up to high molecular weight structures of about 1,000,000 Dalton, based on practical synthesis and use considerations. The phrases internal olefinic and internal alkenyl have been used interchangeably in this document, meaning that any such aliphatic C═C unit does not have a $CH_2$=component. As used herein, R with a superscripted number (such as $R^1$, $R^2$, etc.) indicate certain substituents which may be specified or otherwise defined. As used herein, R with no superscript also may indicate certain substituents which may be specified or defined. R may contain a subscript indicating a number of R substituents at a certain position (i.e., R may indicate one such substituent, $R_2$ may indicate two such substituents, and so on). The simplest of these internal dienes could be represented by Formulas II and III. Some of these types of internal diene containing siloxanes, hydrocarbon ethers and hydrocarbons are represented in Formulas II-VII, including some specific compounds/molecules.

II

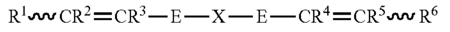

III

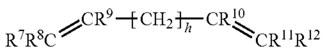

IV $[\{OSi(R^1CR^2{=}CR^3)R\}_j\{OSiR_2\}_k]$

V $R^1CR^2{=}CR^3SiR^{13}R^{14}[OSi(R^1CR^2{=}CR^3)R]_x[OSiR_2]_yOSiR^{13}R^{14}CR^4{=}CR^5R^6$

VI $Me_3Si[OSi(R^1CR^2{=}CR^3)R]_x[OSiR_2]_yOSiMe_3$

VII $[\{OSi(R^1CR^2{=}CR^3)\}_l\{OSiR_2\}_m\{OSiR_3\}_n]_p$ where $R^1$ and $R^6$ are independently an alkyl,aryl or silyl group, or H, alkyl or aryl if $CR^2$═$CR^3$ or $CR^4$═$CR^5$ is part of a cyclic structure such as a cyclic olefin. $R^2$, $R^3$, $R^4$, and $R^5$ are H or independently an alkyl or aryl group; $R^2$ and $R^3$ and/or $R^4$ and $R^5$ taken together may form part of a cyclic structure. Both E are either $SiR^{13}R^{14}$ where $R^{13}$ and $R^{14}$ are independently alkyl or aryl, or $CR^{15}R^{16}$ where $R^{15}$ and $R^{16}$ are independently H, alkyl or aryl. X is preferably oxygen (O) and less preferably nitrogen (N) or divalent hydrocarbyl group, the simplest being $CH_2$.

The radicals in each pair $R^7/R^8$ and $R^{11}/R^{12}$ could both be independently alkyl, aryl or silyl, but only one in either pair could be H, meaning both unsaturations in III are internal. Either $R^7$ or $R^8$ taken together with $R^9$ could be part of a cyclic structure, as could either $R^{11}$ or $R^{12}$ taken together with $R^{10}$: h=0-3.

Further, for higher siloxane-based structures, linear, branched, cyclic, cage or network, it is preferred that at least two neighboring siloxane units should each contain the internal olefinic group so that a diene structure can form to chelate/bind a Pt atom. Obviously, oligomeric or polymeric siloxanes could or would have many such neighboring unsaturated siloxane units. While the size of the alkyl, aryl and internal alkenyl group is not intended to be limiting in the above structures, C1-C20 alkyl, C6-C14 aryl and C3-C18 alkenyl groups, optionally containing heteroatoms such as N, O, halogen, Si, etc., are preferred for each substituent/molecule. Most preferred are Me for alkyl substituents, phenyl for aryl substituents and alkenyl chain length of 3-8 for Formula I, II, IV-VII and C5-C8 cyclic olefin size for I, II, IV-VII. For III, one or both C═C unsaturations could be part of a cyclic structure of 5-10 carbons. In consecutive embodiments, preferred formulae for III being IIIa, IIIb, IIIc, IIIaa, IIIbb and IIIcc. A disiloxane or ether of Formula II, or Formula III, may be unsymmetrical which could lead to chiral complexes of Pt or the other metals of this invention that could be beneficial in asymmetric synthesis via hydrosilylation and other reactions. Substituents, including on cyclic structures and alkenyl groups could independently contain heteroatoms (such as N, O, Si, P, S or halogen) as long as these do not lead to detrimental effects on hydrosilylation and potentially provide one or more advantages.

For Formulae IV-VI, each R independently represents an alkyl or aryl radical of carbon chain size as described above. A methyl group for alkyl and phenyl for aryl are preferred. For cyclic siloxanes, cyclotrisiloxane to cyclohexasiloxanes are preferred (j+k=3-6, j=2-6, k=0-4). Most preferred are cyclotetra-, and cyclopentasiloxanes. In one embodiment, a cyclosiloxane of this invention is represented by Formula IVa-1. In a second embodiment, a cyclosiloxane of this invention is represented by Formula IVa-2. In a third embodiment, a cyclosiloxane of this invention is represented by IVa-3. In another embodiment, a cyclosiloxane of this invention is represented by Formula IVb, where n=1-4. x, y, 1, m, n (for VII), and p could have values such that the range of molecular weights would be from that of a trisiloxane to about 500,000 Daltons. Preferred are molecular weights from that of a trisiloxane to about 50,000, more preferred from trisiloxane to about 10,000, most preferred from a trisiloxane to about 5000. It will be recognized that a variation of structure V or VI would have an M unit at one terminus and a terminal M' unit containing an internal alkenyl substituent at the other terminus. For VII, $T_8$-$T_{12}$ are most preferred for cage-like structures. Further, for VII R represents an alkyl, aryl or alkenyl group. For alkyl groups, methyl is most preferred and for aryl groups, phenyl is most preferred. For aliphatic internal alkenyl groups most preferred are cyclooctenyl, cyclohexenyl, propenyl, but-1-enyl, n-hex-1-enyl, n-oct-1-enyl, and 2-trimethylsilylethenyl as exemplified in Formulae IIaa-IIag below. For aromatic substituted internal alkenyl groups, 2-phenylethenyl is the most preferred (IIah). For cages, resins and network structures, maximum molecular weights that still keep the resin soluble in practical organic/siloxane solvents are preferred.

For the purposes of this invention, it will also be recognized that for supported Pt catalysts, the support could contain silane/siloxane structures carrying the internal olefinic/dienic ligands of this invention, making such catalysts reside in a unique and hybrid class of anchored, "homogeneous" Pt catalysts. Specifically, common supports such as silicon oxides, aluminum oxides, titanium oxides or cerium oxides (hereforth, silica, alumina, titania or ceria) could be surface treated with chlorosilanes, siloxanes, or silazanes containing an internal alkenyl group of this invention, leading to supports that could then bind Pt(0) or Pt(II), or SiH-functional silica (containing preferably $T^H$ units) could be used to attach internal olefinic groups to the surface Si atoms of silica via direct hydrosilylation of C3 and above preferably terminal alkynes. The latter method, i.e., hydrosilylation, is preferred for silica. Another process would utilize co-hydrolysis of $SiCl_4$/$Si(OEt)_4$ (or $AlCl_3$ for alumina) and $RSiCl_3$/$RSi(OEt)_3$, where R represents H or an internal olefinic group with the C═C unit directly bound to Si. The SiH-functional silica thus made could be used to hydrosilylate the C3 and longer alkynes. Again, a particularly distinguishing feature of such supported Pt catalysts would be that their vinyl-Si or other terminal alkenyl-Si functionalized equivalents do not exist as they would be useless beyond one cycle to act as supported and reusable catalysts since the terminal C═C ligand would be hydrosilylated, thereby precipitating and/or leaching Pt. Thus, supported Pt(0) and Pt(II) catalysts with internal dienic siloxane or hydrocarbon ether or hydrocarbon ligands would provide unique reusable hydrosilylation catalyst opportunities, including running continuous processes in Plug Flow or Packed Bed Reactors. Such operations would be novel with pendent Pt(0) and even Pt(II) internal-olefin/diene complexed catalysts (pendent phosphine-complexed Pt and a few others are known from old polymer-anchored catalyst literature but not commercial to the author's knowledge). It will be understood from the above on supported catalysts that Group IX, Group X or other Pt group metal catalysts, in zero or higher oxidation states of the metal could also be anchored to inorganic or other polymeric supports containing the internal olefinic/dienic ligands of this invention. These would then constitute further novel supported transition metal catalysts for use in organic transformations. Examples of such organic transformations include C—C, C—N, or C—O bond-forming coupling reactions and addition reactions with HX where X is a heteroelement, and even polymerization reactions. Hydrogenation, that is addition of H—H across C═C and other unsaturations would likely not be a reaction that would be advantageously facilitated by catalysts of this invention as the internal olefinic ligands themselves would be susceptible to hydrogenation.

For the supported catalysts, the loading of internal alkenyl groups would provide at least 1 alkenyl group per Pt atom, but preferably 3-20 alkenyl groups per Pt atom, most preferably 3-10 internal alkenyl groups per Pt atom, suitable for a final weight percent Pt loading of 0.25-25, preferably 0.5-20 and most preferably 1-10 of the total weight of the supported catalyst. The optimal loadings and range of loadings of the internal alkenyl groups and the ratio of these to Pt and total Pt loadings could be determined readily via hydrosilylation experiments by those skilled in the art. Optimal loadings of the internal olefinic groups and metal for the other metals of this invention could be determined via experimentation by those skilled in the art and familiar with the catalyzed reaction in question.

For resin structures VII and internal diene-functional supports, it will be understood that the same principle as above would apply for preferably at least some sets of immediate neighbor surface siloxane/silica/alumina/titania/ceria units to contain the internal alkenyl substituent, and that not all units need contain such an olefinic substituent.

Formulae IIa, IIaa-IIah, IIb, IIba-IIbe, IIIa-IIIc, IIIaa, IIIbb, and IIIcc represent various embodiments and/or specific examples of the internal dienic ligands II and III. Squiggly bonds in Formulae refer to indefinite geometry (cis- or trans-) at those bonds, as is accepted notation in chemical structure drawing.

IIa $R^1CR^2{=}CR^3SiMe_2OSiMe_2CR^4{=}CR^5R^6$

IIaa

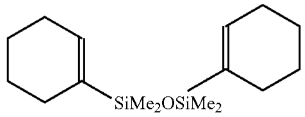

IIab

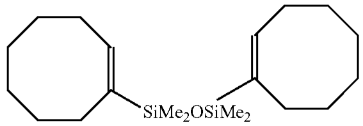

IIac $Me{\sim}CH{=}CHSiMe_2OSiMe_2CH{=}CH{\sim}Me$

IIad $CH_3CH_2{\sim}CH{=}CHSiMe_2OSiMe_2CH{=}CH{\sim}CH_2CH_3$

IIae $EtCH_2CH_2{\sim}CH{=}CHSiMe_2OSiMe_2CH{=}CH{\sim}CH_2CH_2Et$

IIaf $Et(CH_2)_3CH_2{\sim}CH{=}CHSiMe_2OSiMe_2CH{=}CH{\sim}CH_2(CH_2)_3Et$

IIag $Me_3Si{\sim}CH{=}CHSiMe_2OSiMe_2CH{=}CH{\sim}SiMe_3$

IIah $C_6H_5{\sim}CH{=}CHSiMe_2OSiMe_2CH{=}CH{\sim}C_6H_5$

IIb $R^1CR^2{=}CR^3CR^{15}R^{16}OCR^{15}R^{16}CR^4{=}CR^5R^6$

IIba $Me{\sim}CH{=}CHCH_2OCH_2CH{-}CH{\sim}Me$

IIbb

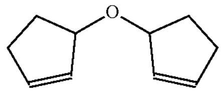

IIbc

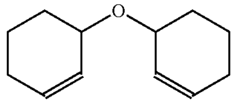

IIbd

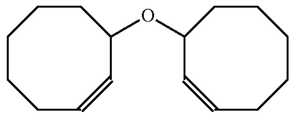

IIbe $Et_3Si{\sim}CH{=}CHCH_2OCH_2CH{=}CH{\sim}SiEt_3$

IIIa $Me{\sim}CH{=}CH{-}CH{=}CH{\sim}Me$

IIIb $Me{\sim}CH{=}CH{-}CH_2{-}CH{=}CH{\sim}Me$

IIIc $Me{\sim}CH{=}CH{-}CH_2CH_2{-}CH{=}CH{\sim}Me$

IIIaa

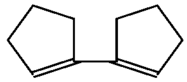

IIIbb

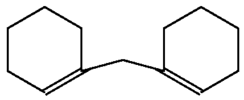

IIIcc

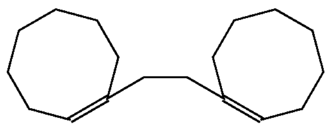

-continued

IVa-1

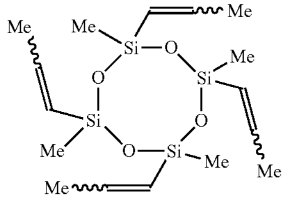

IVa-2

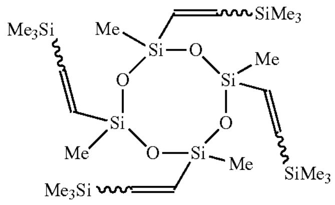

IVa-3

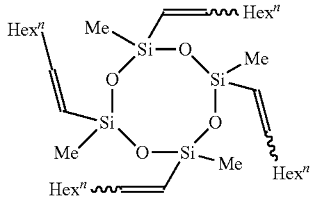

IVb

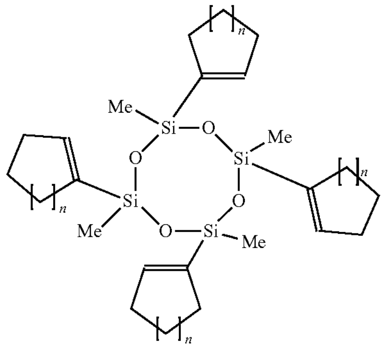

Disiloxanes of the type IIa have been prepared by Denmark and Wang (Chem. Lett. 2001, 3, 1073), by Wu et al (Chinese Chemical Letters 2010, 21, 312) and their synthesis and use as coupling agents have been reported by Denmark and Wang above and by Spring et al (Org. Biomol. Chem 2011, 9, 504)—all three publications are incorporated herein in their entirety by reference. It is noteworthy that compounds of the type IIa, used as coupling agent by Denmark and by Spring destroys (consumes) these internal-dienyldisiloxanes and, to the author's knowledge, these internal dienes have not been used as ligands in metal complex catalyzed reactions. The use of the terminally unsaturated 1,3-divinyltetramethyldisiloxane as a ligand on Pd catalysts has been reported recently for Buchwald-Hartwig type reaction by Fantasia et al (Organometallics 2021, 40, 2384) for C—N coupling where the terminally unsaturated disiloxane is considered a "throw away" ligand. Suzuki-Miyaura coupling reactions using 1,3-divinyltetramethyldisiloxane as a ligand on Pd catalysts has also been reported (Chem. Commun. 2000, 2475). Teachings of both coupling publications are incorporated herein in their entirety by reference. There is no indication that disiloxanes with internal dienic unsaturation might be of value in producing persistently stable catalysts or even re-usable catalyst compositions, which is one of the important inventive features of the present invention.

Various Pt catalysts containing other siloxane-based ligands with terminal C═C unsaturation are described and exemplified in U.S. Pat. Nos. 5,175,325 and 2,009,017 and European Patent No. 0979837, in addition to Karstedt's and Ashby's US Patents cited above. These catalysts would be expected to lose the terminal C═C ligands to hydrosilylation during the activation period and/or during hydrosilylation, and unable to prevent Pt activity loss to aggregation and ultimate precipitation. This is a key element of catalysis improvement addressed by the present invention.

The Pt catalysts of this invention are exemplified by the Formulas VIII-XVII, those that form in-situ, as well as heterogeneous, supported versions. Based on the crux of this invention, the primary criterion that differentiates the catalyst(s) envisaged vs. essentially all others known of similar structure, is that either the Pt complex directly, as a discrete species, contains one or more of the internal dienic/olefinic ligands of this invention or one or more of these internal dienic ligands is/are added to a common/known Pt salt/compound/complex (such as Pt halides, chloroplatinic acid, $K_2PtCl_4$, Karstedt's or Ashby's catalyst or $CODPtX_2$, $Pt(nbd)X_2$, $(olefin)_2PtX_2$, $dienePtX_2$ where X is halide, methyl, benzyl, phenyl or acetylide group), or other terminal-olefin-siloxane-containing Pt complex, to generate the catalysts of this invention that would not lose the internal olefinic ligands to hydrosilylation. Thus, a steady concentration of the (active) Pt catalyst of this invention would be maintained to provide stable rate of activity throughout the hydrosilylation reaction. This differentiation would also be true of supported Pt complexes described above based on the internal dienic ligands of this invention, as catalyst leaching and/or agglomeration of metal would be eliminated or reduced. In fact, supported Pt catalysts for hydrosilylation containing vinyl-functional ligands of any type do not exist because they would only be good for one cycle, which defeats the reusability and other advantages of supported catalysts. It will also be recognized that the benefits from the internal olefinic/dienic ligands of this invention that are expected for Pt could also be expected for the metals of Periodic group IX, X and Pt Group metals (Ru, Os, Co, Rh, Ir, Ni and Pd), especially with respect to catalyst stabilization and catalyst level reduction, potentially faster rates of reaction, product and process improvements, and the associated economic and environmental gains that can be achieved.

VIII $$[R^1\sim CR^2{=}CR^3{-}E{-}X{-}E{-}CR^4{=}CR^5\sim R^6]_m[Pt]_n[L]_p$$

For Formula VIII, the description of substituents is as for Formula II, where $R^1$ and $R^6$ are independently an alkyl or aryl group or H or alkyl/aryl if $CR^2{=}CR^3$ or $CR^4{=}CR^5$ is part of a cyclic structure such as a cyclic olefin. $R^2$, $R^3$, $R^4$, and $R^5$ are H or independently an alkyl or aryl group; $R^2$ and $R^3$ and/or $R^4$ and $R^5$ taken together may form part of a cyclic structure. Both E are either $SiR^{13}R^{14}$ where $R^{13}$ and $R^{14}$ are independently alkyl or aryl, or $CR^{15}R^{16}$ where $R^{15}$ and $R^{16}$ are independently H, alkyl or aryl, containing preferably 1-20 carbons. X is preferably oxygen (O) and less preferably nitrogen (N) or divalent hydrocarbyl group, the simplest being $CH_2$. L is a monodentate or bidentate neutral ligand exemplified by organophosphines, CO, etc., and p=0-1. The ratio m:n is independently 1:1 to 2:1, with 3:2 being preferred for Pt, though as noted earlier small excesses of the internal dienic ligands will possibly be required to improve stability of catalyst compositions either as discrete complexes or in solution (as noted by Roy and Taylor for $CODPtSi_2$ complexes in JACS 2002, 124, 9510 and also known for Karstedt-type catalysts. See also Pt and mechanism sections of hydrosilylation review in Advances in Organometallic Chemistry 2008, 55, 1-59). In one embodiment, the preferred metal is Pt. In another embodiment Formula VIIIA could also represent complexes of other metals of Periodic Group IX or X or other Pt Group metals (Ru, Os, Co, Rh, Ir, Ni or Pd). The sym-divinyltetramethyldisiloxane complexes of Pd and Ni that are equivalent to Karstedt's complex are known (JACS 1999, 121, 9807 and JOMC 2000, 597, 175). However, the ratio of m:n could vary amongst the different metal complexes formed, from 1:1 to 2:1, with the stipulation that complexes of these other metals contain at least one internal dienic ligand of this invention in the metal complex formula and any additional ligand(s) L' to produce a coordinatively viable complex. p=0-4. The complexes could be monomeric or dimeric. Each L', independently, would be represented by monodentate/multidentate/multihapto ligands such as organophosphines, organosulfides, olefins or dienes, eta-6-arenes, halides, or alkyl or aryl

VIIIA $$[R^1\sim CR^2{=}CR^3{-}E{-}X{-}E{-}CR^4{=}CR^5\sim R^6]_m[M_t]_n[L']_p$$

VIIIA-1

$$[R^1\sim CR^2{=}CR^3{-}E{-}X{-}E{-}CR^4{=}CR^5\sim R^6]_m[Pd]_n[L']_p$$

wherein, For Formula VIIIA-1, the description of substituents is as for Formula II, where $R^1$ and $R^6$ are independently an alkyl or aryl group or H, alkyl/aryl if $CR^2{=}CR^3$ or $CR^4{=}CR^5$ is part of a cyclic structure such as a cyclic olefin. $R^2$, $R^3$, $R^4$, and $R^5$ are H or independently an alkyl or aryl group; $R^2$ and $R^3$ and/or $R^4$ and $R^5$ taken together may form part of a cyclic structure. Both E are either $SiR^{13}R^{14}$ where $R^{13}$ and $R^{14}$ are independently alkyl or aryl, or $CR^{15}R^{16}$ where $R^{15}$ and $R^{16}$ are independently H, alkyl or aryl, containing preferably 1-20 carbons. X is preferably oxygen (O) and less preferably nitrogen (N) or divalent hydrocarbyl group, the simplest being $CH_2$. L is a monodentate or bidentate neutral ligand exemplified by triorganophosphines, CO, etc., and p=0-1. The ratio m:n is independently 1:1 to 2:1, with 3:2 being preferred for Pd, though as noted for VIII and VIIIA small excesses of the internal dienic ligands will possibly be required to improve stability of catalyst compositions either as discrete complexes or in solution. Examples of VIIIA-1 are:

VIIIA-1a

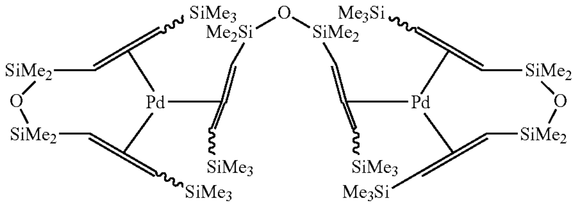

-continued

VIIIA-1b

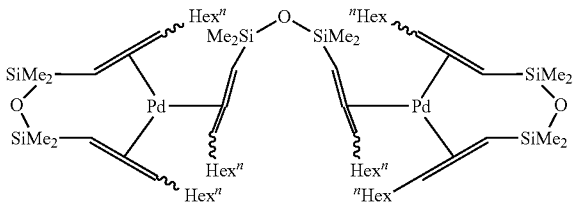

wherein, m:n is 3:2, and L'=0 in Formula VIIIA-1, and the siloxane ligands are IIag and IIaf. Excess IIag or IIaf may be required to stabilize VIIIA-1a or VIIIA-1b, respectively.

Organometallic complexes VIII-XII represent various embodiments and/or specific examples of Pt complexes that are expected to form as discrete species or dynamic in-situ compounds from internal dienic ligands of Formulae II and Pt.

VIIIab

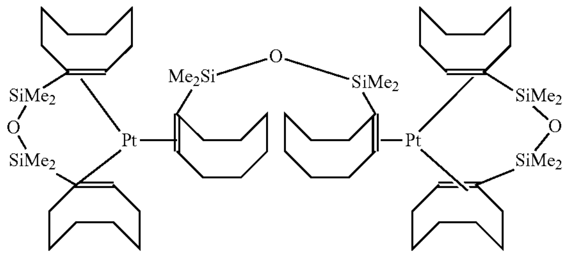

VIIIac

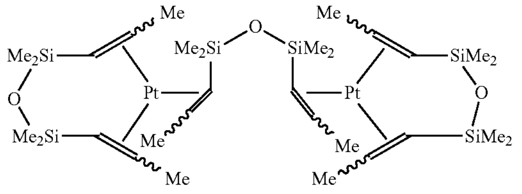

VIIIad

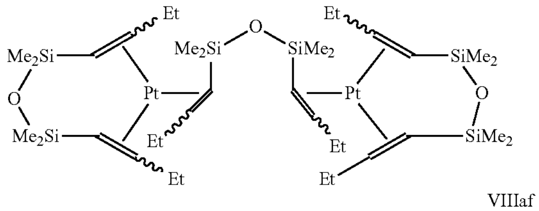

VIIIaf

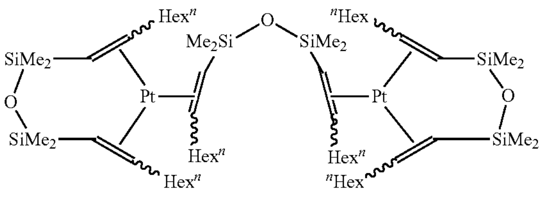

-continued

VIIIag

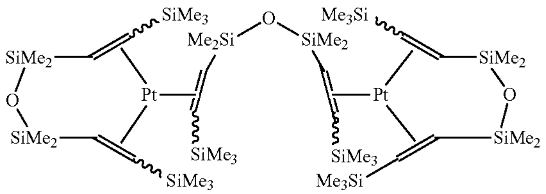

VIIIah

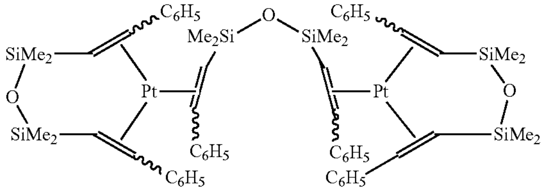

VIIIb

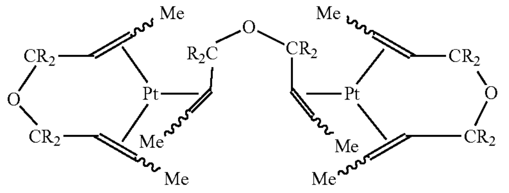

VIIIba

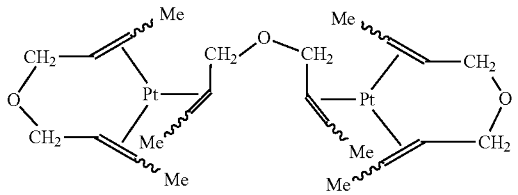

VIIIbe

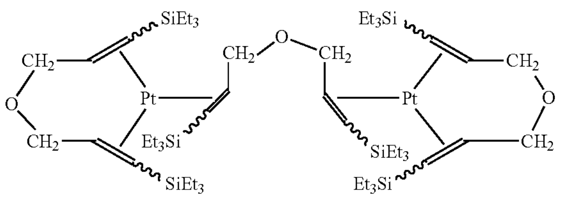

The complexes VIIIab-ah would be based on ligand IIab, IIac, IIad, IIaf-ah, respectively, whereas complex VIIIba and VIIIbe would be based on ligands IIba and IIbe. Complex VIIIb would be based on ligand IIb, with R as defined for substituents in IIb.

The complex VIIIB-1 and VIIIB-2 represents a Pt complex based on the cyclic siloxanes IVa-2 and IVa-3 where the ratio of x;y is such that there are optimally three olefinic groups available for bonding per Pt. As noted earlier, there need not be an internal olefinic group present on every Si of the cyclic siloxane, but at least two adjacent siloxane units should have one such olefinic group in one cyclic unit.

VIIIB-1

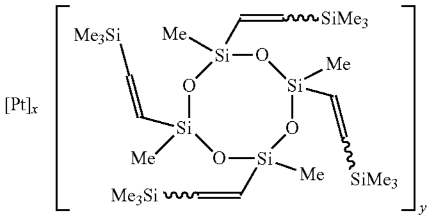

VIIIB-2

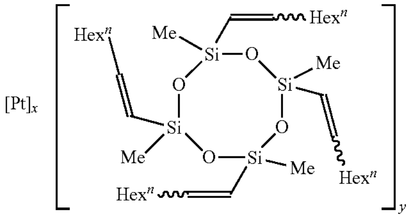

IX

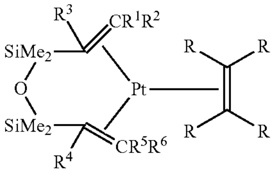

X

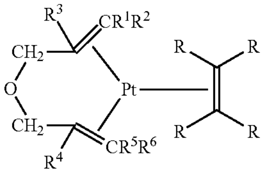

IXa

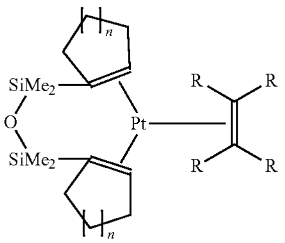

Xa

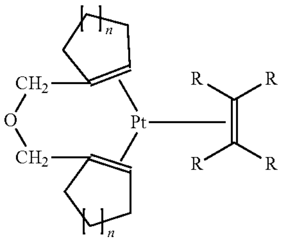

IXb

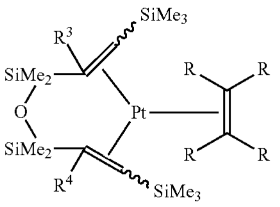

-continued

Xb

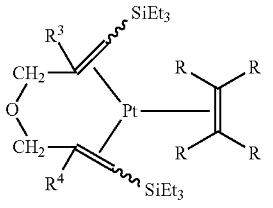

IXc

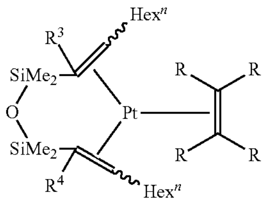

XI

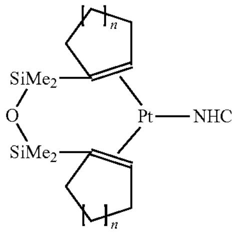

XII

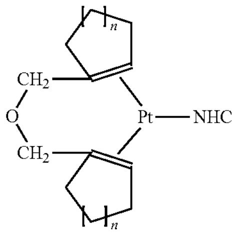

Pt-complex Formulae IX-XII represent mononuclear complexes based on internal dienic ligands of the type II. The substituents $R^1$-$R^6$ in the siloxane and hydrocarbon ether portions in complexes IX and X are independently as described for the equivalent ligands in II and R in IX and X are alkyl or aryl groups optionally and independently containing heteroatoms, and when taken together on adjacent carbon atoms could form a cyclic structure. For example, the monoolefin in IX, X, IXa, IXb, IXc, Xa or Xb could be cyclohexene, tetracyanoethylene, 2-methyl-1,4-naphthaquinone, maleic anhydride, dimethyl maleate, dimethyl fumarate, etc. It will be understood that electron-deficient olefins such as dimethyl maleate/fumarate may impart higher stability to some of the complexes with Formulae II ligands and could yield some preferred catalysts of this invention as determined from stability observations and solubility considerations, provided they also meet rate, desired product yield and other requirements. A further metal complex stability enhancement could be expected if a silyl group is the substituent at the 2-position of the internal C═C unsaturation with respect to E (Si or C) in Formula II, as in IXb and Xb. NHC in complexes XI and XII stands for N-heterocyclic carbene ligand. The value of n in Complexes IXa, Xa, XI and XII could be preferably 1-4 (implying cyclopentene-cyclooctene moieties). Complexes of the type IX-XII could be prepared via ligand displacement reactions from equivalent complexes of the type VIII, as described by Marko et al and others (Organometallics, 2007, 26, 5731; Chem. Eur. J. 1998, 4, 2008), which are incorporated herein in their entirety by reference. It will be understood that Pt complexes of Formulae IX-XII, represent only a very small number of combinations of ligands II and monoolefin or NHC with Pt. Many others that are suitable/efficacious could be designed by those skilled in the art based on the principles of this invention and teachings of the relevant patents/publications referenced herein. The same would apply for the other metals of periodic Groups IX and X and Pt group of this instant invention. For the latter metals (as also for Pt), an organophosphine ligand could take the place of the monoolefin or NHC ligand. Generally, for hydrosilylation, though, phosphines tend to slow reaction rates, but they are useful for many coupling reactions.

In another embodiment, complexes of the type IX-XII, independently representing ligands II, with substituents as described for ligand II also form part of this invention. In one embodiment for Formula IX, the siloxane ligand is IIaf and the monoolefin is dimethyl maleate while in another, the siloxane ligand is IIaf and the monoolefin is dimethylfumarate. In another embodiment the siloxane ligand is IIag and the monoolefin is dimethyl maleate. In a fourth embodiment, the siloxane ligand is IIag and the "monoolefin" is diallyl maleate. In a fifth embodiment, the siloxane ligand is IIh, and the monoolefin is dimethyl fumarate. For Formula X, in one embodiment the ether ligand is IIbe and the monoolefin is dimethyl maleate. For Formulae IXa, in one embodiment the siloxane ligand is IIab and the monoolefin is dimethyl fumarate. For Formula Xb, in one embodiment the ether ligand is IIbe and the monoolefin is 2-methyl-1,4-naphthaquinone. For Formula XI, in one embodiment, the siloxane ligand is IIag and the NHC ligand is 1,3-bis(2,6-diisopropylphenyl)imidazole-2-ylidene. For Formula XII, in one embodiment the ether ligand is IIbe and the NHC ligand is 1,3-bis(2,6-diisopropylphenyl)imidazole-2-ylidene.

In the context of the SiO-based internal dienic ligands, Formula XIII denotes a general formula of Pt complexes derivable from these ligands:

$$[M_aM'_bD_cD'_dT_eT'_fQ_g]_m[Pt]_n[L]_p \qquad \text{XIII}$$

where values of m and n are such that at least 3 aliphatic, internal olefinic C═C group per Pt are available on the SiO-based ligand (with two internal C═C being on adjacent silicon atoms), with a preferred level of 4-3 internal aliphatic C═C groups per Pt, most preferred being 3 such groups per Pt. However, optional excess free ligand may further increase stability of XIII. L is a monodentate or bidentate ligand such as an organophosphine or CO and p=0-4 per the non-Pt metals Ru, Os, Co, Rh and Ir, and 0-1 for Ni, Pd and Pt. Pt concentration by weight can vary between 0.2 and about 38 percent, preferably between 0.5 and 20 percent and most preferably between 2 and 10 percent in an initial catalyst formula/formulation. A discrete catalyst type or mixtures may be diluted with additional free ligand and/or short-chain siloxane/polyether fluid with the internal olefinic ligand group at both termini of the chain. Further dilutions with solvent could occur. Higher values of ligand:Pt ratios could be utilized based upon experimental findings that are advantageous. In one embodiment Formula XIIIA could represent a complex of another metal, $M_t$, from Periodic Group IX or X or another Pt Group metal (Ru, Os, Co, Rh, Ir, Ni, or Pd, in zero oxidation state.) For complexes of the non-Pt metals of this invention there may be one or more ligands such as organophosphines or CO present.

XIIIA $$[M_aM'_bD_cD'_dT_eT'_fQ_g]_m[M_t]_n[L]_p$$

It will be recognized by those skilled in the art that the above Pt complexes with the internal dienes are idealized structures based on known complexes that are similar and have been characterized, but they may not be isolatable or completely characterizable in many instances and this aspect of coordination complexes is well known in the field. Nevertheless, it can be envisaged that based on their intrinsic property of metal-binding ability, the internal dienes will complex with Pt and behave similarly to the known vinylsiloxane complexes or olefin complexes, with the exception that the internal dienic ligands of the present invention would not be hydrosilylated and continue to leverage their stabilizing (and other) properties towards improved catalysis. Further, complexes of the type IX-XII could exhibit stability and activity characteristics better suited to hydrosilylation catalysis, especially where the monoolefin is electron-deficient and/or the internal diene has a silyl substituent as noted above. This would be checked/borne out in experimentation by those skilled in the art.

Pt(II) complexes based on internal dienic ligands of the type III would likely take monomeric or dimeric structural forms XIV-XVII, with either eta-4 or eta-2, eta-2 type bonding to the metal center(s) (Dalton Trans. 2012, 41(23), 7156; J. Chem. Soc Dalton Trans. Inorg. Chem. 1982, 2, 457).

XIV

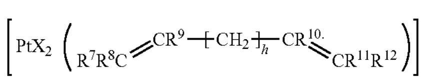

XV

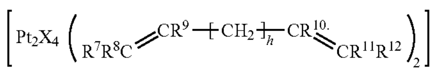

XVI

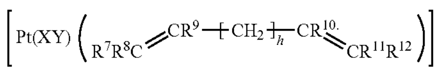

XVII

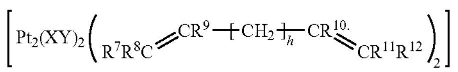

wherein, X represents a halide ion (with chloride preferred) or independently an alkyl, aryl, alkenyl or alkynyl group (examples being methyl, phenyl, vinyl, acetylide), XY represents a dianionic ligand such as one based on catechol, and further examples of which are described in U.S. patent Ser. No. 10/047,108 and U.S. patent application Ser. No. 15/502,325 which are incorporated herein in their entirety by reference. $R^{7-12}$ are as described for ligand III earlier; h=0-3. The other metals of the instant invention are expected to have similar Formulae, varying slightly based on oxidation state and available coordination sites. Additional ligands, as noted above, such as halides, ligands coordinated through nitrogen, oxygen, phosphorus, sulfur or carbon centers, to balance charge/oxidation state and coordination sites, may be involved with the non-Pt metal complexes of this invention.

A precise single Formula for discrete or dynamic, internal diene complexes of the non-Pt metals of this invention, spanning a range of oxidation states (0, I, II, III and possibly even IV) and a greater number of possible coordination numbers, hapticities or ligand, and mono- or dimeric species, is difficult to propose but an approximate formula, containing at least one internal diene of the instant invention, may be represented by Formula XVIII

XVIII $$M_a(ID)_b(L^1)_c(LL)_dX_e$$

where M=Ru, Os, Co, Rh, Ir, Ni, Pd; ID=an internal diene of this invention; $L^1$=neutral, anionic or cationic C, N, O, P or S based ligand or a hydride/deuteride ligand; LL=a neutral, cationic, anionic, multidentate/mutihapto ligand with C—, N—, O—, P—, or S— donor sites; X=a counterion when the complex moiety has a charge but could be part of the complex moiety itself; a=1-2, b=1 or 2, c=0-4, d=0-2 and e=0-4.

The use of the above types of Pt complexes of internal dienes for hydrosilylation is expected to lead to process and product improvements in potentially multiple ways. First, and perhaps most important, is stabilization of the Pt center as a homogeneous species (or anchored homogeneous species in supported catalysts), unlike complexes of the Karstedt-type where it is understood that the divinyldisiloxane ligands are hydrosilylated away early during catalysis, which gradually leads to activity reduction, Pt precipitation or other undesirable characteristics such as yellow to brown products over time that is especially detrimental for finished products such as elastomers. The same instability/vulnerability as Karstedt's catalyst is true of other Pt compounds such as Speier's catalyst, even though these are otherwise workhorse industrial catalysts. Since most internal olefins hydrosilylate at orders of magnitude slower rates than ordinary terminal ones, but nevertheless are known to bind to Pt, chelating complexes derived from internal olefinic dienes are envisaged in this invention to provide stability and longevity of the active Pt catalyst. This would occur via the internal olefinic dienes either remaining bound to the metal wholly or partially (eta-4 or eta-2 bonding modes), or being in the vicinity of the metal to provide binding to eliminate/reduce loss of activity to aggregation. This could then lead to heretofore unknown or at least significant levels of improvement in catalysis, including reduced Pt usage, faster reaction times, better processes, no or lower color, and reduced loss to by-products, all of which continue to be ongoing improvement needs. For example, release liner coating compositions containing siloxanes require very high to high levels of Pt for extremely fast cures because of high line speeds. Up to even 100+ ppm of Pt may be required for highly specialized processing in this important commercial application (see review Coord. Chem. Rev. 2011, 255, 1440.) Thus, it is conceivable that Pt catalysts based on this invention would help reduce Pt usage in some of this application via Pt stabilization and perhaps even faster activation and reaction rate for hydrosilylation. As large quantities of Pt are used, and irretrievably lost, in this application, even small advances with Pt reduction and/or faster rate of reaction would be highly welcome in this industry. Addition cure/crosslinking, in general, with Pt could benefit from reduced Pt use, potentially faster/more complete reaction and no or reduced yellowing of the finished elastomeric product.

The description of alkyl, aryl, olefinic, alkenyl, unsaturated compound, substituent, inert substituent, silylhydride, siloxane hydride, etc., that are used herein are described in detail in U.S. Pat. No. 9,434,749 which are incorporated herein in their entirety by reference.

Herein, any unsaturated compound, the hydrosilylation of which uses the envisaged internal diene complexed Pt catalysts of this invention, refers to compounds containing one or more double or triple bonds. In one embodiment, it refers to carbon-carbon double or triple bonds.

Thus, for example, the unsaturated compound containing at least one unsaturated functional group employed in the hydrosilylation reaction is generally not limited and can be chosen from an unsaturated compound as desired for a particular purpose or intended application. The unsaturated compound can be a mono-unsaturated compound or it can comprise two or more unsaturated functional groups. In one embodiment, the unsaturated group can be an aliphatically unsaturated functional group. Examples of suitable compounds containing an unsaturated group include, but are not limited to, unsaturated polyethers such as alkyl-capped allyl polyethers, vinyl functionalized alkyl capped allyl or methylallyl polyethers; terminally unsaturated amines; alkynes; C2-C45 linear or branched olefins, in one embodiment alpha olefins; terminally unsaturated dienes; unsaturated epoxides such as allyl glycidyl ether and vinyl cyclohexene-oxide; terminally unsaturated acrylates or methacrylates; unsaturated aryl ethers; aliphatically unsaturated aromatic hydrocarbons; unsaturated cycloalkanes such as trivinyl cyclohexane; vinyl-functionalized polymer or oligomer; vinyl-functionalized and/or terminally unsaturated allyl-functionalized silane and/or vinyl-functionalized silicones; unsaturated fatty acids; unsaturated fatty esters; or combinations of two or more thereof. Illustrative examples of such unsaturated substrates include, but are not limited to, ethylene, propylene, isobutylene, 1-hexene, 1-octene, 1-octadecene, styrene, alpha-methylstyrene, cyclopentene, norbornene, 1,5-hexadiene, norbornadiene, vinylcyclohexene, allyl alcohol, allyl-terminated polyethyleneglycol, allylacrylate, allyl methacrylate, allyl glycidyl ether, allyl-terminated isocyanate- or acrylate prepolymers, polybutadiene, allylamine, methallyl amine, methyl undecenoate, acetylene, phenylacetylene, vinyl-pendent or vinyl-terminal polysiloxanes, vinylcyclosiloxanes, vinylsiloxane resins, other terminally-unsaturated alkenyl silanes or siloxanes, vinyl-functional synthetic or natural minerals, etc.

Unsaturated polyethers suitable for the hydrosilylation reaction include polyoxyalkylenes having the general formula:

$$R^{17}(OCH_2CH_2)_z(OCH_2CHR^{27})_w—OR^{18} \quad \text{(XIX); or}$$

$$R^{18}O(CHR^{19}CH_2O)_w(CH_2CH_2O)_z—CR^{20}{}_2—C≡C—CR^{20}{}_2—(OCH_2CH_2)_z(OCH_2CHR^{19})O_wR^{18} \quad \text{(Formula XX); or}$$

$$H_2C=CR^{19}CH_2O(CH_2CH_2O)_z(CH_2CHR^{19}O)_w CH_2CR^{20}=CH_2 \quad \text{(Formula XXI)}$$

wherein $R^{17}$ denotes an unsaturated organic group containing from 2 to 10 carbon atoms such as vinyl, allyl, methallyl, propargyl or 3-pentynyl. When the unsaturation is olefinic, it is desirably terminal to facilitate smooth hydrosilylation. However, when the unsaturation is a triple bond, it may be internal. $R^{18}$ is independently hydrogen, an alkyl group, e.g., from 1 to 8 carbon atoms such as the alkyl groups $CH_3$, n-$C_4H_9$, t-$C_4H_9$ or i-$C_8H_{17}$, and an acyl group, e.g., $CH_3COO$, t-$C_4H_9COO$, the beta-ketoester group such as $CH_3C(O)CH_2C(O)O$, or a trialkylsilyl group. $R^{19}$ and $R^{20}$ are monovalent hydrocarbon groups such as the C1-C20 alkyl groups, for example, methyl, ethyl, isopropyl, 2-ethylhexyl, dodecyl and stearyl, or the aryl groups, for example, phenyl and naphthyl, or the alkaryl groups, for example, benzyl, phenylethyl and nonylphenyl, or the cycloalkyl groups, for example, cyclohexyl and cyclooctyl. $R^{20}$ may also be hydrogen. Methyl is the most preferred $R^{19}$ and $R^{20}$ groups. Each occurrence of z is 0 to 100 inclusive and each occurrence of w is 0 to 100 inclusive. Preferred values of z and w are 1 to 50 inclusive.

In one embodiment, the unsaturated compound is chosen from an alkenyl silicone. The alkenyl silicone may be an alkenyl functional silane or siloxane that is reactive to hydrosilylation. The alkenyl silicone may be cyclic, aromatic, or a terminally-unsaturated alkenyl silane or siloxane. The alkenyl silicone may be chosen as desired for a particular purpose or intended application. In one embodiment the alkenyl silicone comprises at least two unsaturated groups and has a viscosity of at least about 50 cps at 25° C. In one embodiment the alkenyl silicone has a viscosity of at least about 75 cps at 25° C.; at least about 100 cps at 25° C.; at least 200 cps at 25 25° C.; even at least about 500 cps at 25° C. Here as elsewhere in the specification and claims, numerical values may be combined to form new and non-disclosed ranges.

In one embodiment, the alkenyl silicone is a compound of the formula:

$$M^{vi}{}_aT_bD_cM_dQ_e$$

wherein $M^{vi}{}_a$=$RR^{21}2R^{22}SiO_{1/2}$; $T_b$=$R^{23}SiO_{3/2}$ where $R^{23}$ is chosen from $R^{21}$ or $R^{22}$; $D_c$=$R^{21}R^{23}SiO_{2/2}$ where $R^{23}$ is chosen from $R^{21}$ or $R^{22}$; $M_d$=$R^{21}{}_3SiO_{1/2}$; and $Q_e$=$SiO_{4/2}$; R and $R^{21}$ are independently selected from a monovalent hydrocarbon radical having one to forty carbon, optionally containing at least one heteroatom; and $R^{22}$ is selected from a terminal olefinic monovalent hydrocarbon radical having two to forty carbon atoms, optionally containing at least one heteroatom. The composition of the alkenyl silicone is such as to provide at least two unsaturated groups reactive to hydrosilylation per chain; a≥0, b≥0, d≥0, e≥0; values for c in particular are determined by the desired properties and attributes of the cross-linked material so that the sum a+b+c+d+e is in the range 50-20,000. Particular alkenyl silicones and cross-linkers chosen to generate desired mechanical, thermal and other properties of the product can be determined by those skilled in the art. Terminally-unsaturated alkenyl silicone materials are particularly suitable for forming cured or crosslinked products such as coatings and elastomers. It is also understood that two or more of these alkenyl silicones, independently selected, may be used in admixture in a cure formulation to provide desired properties.

The silyl hydride and/or hydridosiloxane employed in the reactions is not particularly limited. It can be, for example, any compound chosen from hydrosilanes or hydridosiloxanes (siloxane hydrides) including those compounds of the formulas $R^{24}{}_mSiH_pX_{4-(m+p)}$ or $M_aM^H{}_bD_cD^H{}_dT_eT^H{}_fQ_g$, where each $R^{24}$ is independently a substituted or unsubstituted aliphatic or aromatic hydrocarbyl group, X is halide, alkoxy, acyloxy, or silazane, m is 1-3, p is 1-3, and M, D, T, and Q have their usual meaning in siloxane nomenclature. The subscripts a, b, c, d, e, f, and g are such that the molar mass of the siloxane-type reactant is between 100 and 100,000 Dalton. In one embodiment, an "M" group represents a monofunctional group of formula $R^{25}{}_3SiO_{1/2}$, a "D"

group represents a difunctional group of formula $R^{26}_2SiO_{2/2}$, a "T" group represents a trifunctional group of formula $R^{27}SiO_{3/2}$, and a "Q" group represents a tetrafunctional group of formula $SiO_{4/2}$, an "$M^H$" group represents $HR^{28}_2SiO_{1/2}$, a "$T^H$" represents $HSiO_{3/2}$, and a "$D^H$" group represents $R^{29}HSiO_{2/2}$. Each occurrence of $R^{25-29}$ is independently C1-C18 alkyl, C1-C18 substituted alkyl, C6-C14 aryl or substituted aryl, wherein $R^{25-29}$ optionally contains at least one heteroatom.

The present invention also provides hydrosilylation with hydridosiloxanes comprising carbosiloxane linkages (for example, Si—$CH_2$—Si—O—SiH, Si—$CH_2$—$CH_2$—Si—O—SiH or Si-arylene-Si—O—SiH). Carbosiloxanes contain both the —Si-(hydrocarbylene)-Si— and —Si—O—Si-functionalities, where hydrocarbylene represents a substituted or unsubstituted, divalent alkylene, cycloalkylene or arylene group. The synthesis of carbosiloxanes is disclosed in U.S. Pat. Nos. 7,259,220; 7,326,761 and 7,507,775 all of which are incorporated herein in their entirety by reference. An exemplary formula for hydridosiloxanes with carbosiloxane linkages is: $R^{30}R^{31}R^{32}Si(CH_2R^{33})_xSiOSiR^{34}R^{35}(OSiR^{36}R^{37})_yOSiR^{38}R^{39}H$, wherein $R^{30}$-$R^{39}$ is independently a monovalent alkyl, cycloalkyl or aryl group such as methyl, ethyl, cyclohexyl or phenyl. Additionally, $R^{30-39}$ independently may also be H. The subscript x has a value of 1-8, y has a value from zero to 10 and is preferably zero to 4. A specific example of a hydridocarbosiloxane is $(CH_3)_3SiCH_2CH_2Si(CH_3)_2OSi(CH_3)_2H$.

It is also understood that two or more of these SiH-containing silanes or siloxanes, independently selected, may be used in admixture to generate mixed silylated products, or used in a cure formulation, to provide desired properties.

The hydrosilylation process is conducted in the presence of a platinum catalyst of this invention. The platinum precatalyst or compound employed in the process is not particularly limited and can be chosen from a variety of platinum compounds including, but not limited to, platinum halides, platinum siloxane complexes such as Ashby's or Karstedt's catalyst, cycloalkadiene-platinum complexes, or various other common platinum compounds or complexes known in the art. The catalysts of this invention would/could be synthesized separately or may form during the hydrosilylation reaction using common Pt catalysts or precatalysts such as Speier's or Karstedt's when one or more internal dienes of this invention are added to these precatalysts. It may be advantageous to use Pt(0) starting (precatalyst) sources for the siloxane-based and hydrocarbon-ether-based dienic ligands II, IV-VII, and Pt(II) or Pt(IV) (precatalysts) sources for ligands of the type III for the formation/synthesis of catalysts of this invention. However, the preparation of Pt(0) complexes containing the internal dienic ligands of this invention may begin with compounds and complexes of Pt(II) and Pt(IV), as described below.

In one embodiment, a Pt catalyst of the instant invention comprises a reaction product of a platinum halide and an organosiloxane compound having terminal aliphatic unsaturation (such as Karstedt's complex), or combinations of two or more thereof, followed by addition of the internal dienic siloxanes of this invention. Suitable platinum halides include, but are not limited to, platinum dichloride, platinum dibromide, platinum tetrachloride, chloroplatinic acid (i.e., $H_2PtCl_6.6H_2O$), dipotassium tetrachloroplatinate (i.e. $K_2PtCl_4$), etc. A particularly suitable platinum halide is chloroplatinic acid (either neat but more preferably in an alcoholic solution in ethanol/isopropanol/1-butanol/cyclohexanol, etc.) Platinum catalysts useful in the present invention also include the reaction product of a platinum halide with an organosilicon compound having terminal aliphatic unsaturation together with various levels of the internal dienic ligands of this invention. Vinylsiloxane catalysts are described, for example, in Willing, U.S. Pat. No. 3,419,593, which is incorporated by reference for its teaching of platinum catalysts useful in the present process. Alternatively, the platinum catalyst can be, for example, the reaction product of a solution of chloroplatinic acid in ethanol or 2-propanol optionally in combination with an ethereal solvent at various ratios together with 1,3-bis($Me_3Si$—CH═CH—)-1,1,3,3-tetramethyldisiloxane IIag, one preferred internal dienic ligand of this invention (or IIaf, IIah, etc.) e.g.), at various ligand:Pt ratios, or the reaction products of platinum dichloride or chloroplatinic acid with 1,3-bis($Me_3Si$—CH═CH—)-1,1,3,3-tetramethyldisiloxane (or IIaf, or IIah e.g.), via chemistry similar to that used to make Karstedt's catalyst with the equivalent vinylsiloxane ligand. Preparation of vinylsiloxane-based Pt catalysts are further described in U.S. Pat. No. 5,175,325, US Patent App. No. 2009/0171058, European Patent App. 0979837, U.S. Pat. No. 6,806,440 the teachings and content of which are incorporated herein in their entirety by reference. Multiple synthetic/procedural options would be available to generate Pt(0) complexes containing the internal dienic ligand of this invention.

In another embodiment, the second type of Pt catalysts of this invention, based on Pt(II) structures could potentially be derived from reaction of Pt halides with internal dienic ligands of the type III or via displacement of olefinic or other dienic ligands from e.g., $(olefin)_2$Ptdihalide, (diene)Ptdihalide or dienePt(dialkyl/diaryl/dialkenyl/diacetylide) where the diene is 1,5-cyclooctadiene, norbornadiene, 1,5-hexadiene and the like, or even from $Pt(acac)_2$. Complexes of the type XV and XVII could be prepared from ligands III and CODPtXY whose preparation is described in U.S. patent Ser. No. 10/047,108 which is incorporated herein in its entirety by reference. Grotjahn et al describe the ready synthesis of (1,5-hexadiene)$PtCl_2$ from allyl chloride and $K_2PtCl_4$ (Inorg. Chim. Acta 2010, 364, 272, which is incorporated herein in its entirety by reference). It may well be possible to prepare the equivalent Pt complex of this invention (containing ligand IIIc) in an analogous manner using preferably trans-crotyl chloride in place of allyl chloride. It is to be noted that while the aforementioned cyclic-internal-diene complexes of Pt are well-known, Pt(II) complexes with internal dienes represented by Formula III are unknown to the author's knowledge and, therefore, would represent new Pt compounds, as would non-cyclic internal diene complexes of the non-Pt metals described in this invention.

In one embodiment, for platinum catalysts of Formulae type VIIIab-VIIIah, VIIIB-1, VIIIB2 and XIII (when p=0) the theoretically preferred internal dienic ligand to Pt ratio is 3:2, as in the case of Karstedt's catalyst. However, it will be realized that such structures may be unstable to identification via crystal structure analysis and may even be highly dynamic on an NMR spectroscopy time scale. Nevertheless, as is known for "transient" or weak olefin coordination to Pt (the very basis of various catalytic reactions of olefins including hydrosilylation), the expectation is that such internal dienic complexes will form, albeit perhaps at lower formation constants than for Karstedt's complex and will allow catalysis to proceed, with the dienic ligand always remaining either fully/partially bonded to or in the immediate vicinity of Pt (see discussion by Roy and Taylor in JACS 2002, 124, 9510 and hydrosilylation review noted above) to keep it homogeneous (or anchored homogeneous in supported catalysts). Further, in one embodiment, catalyst complexes of the type VIIIab-VIIIah, VIIIB-1, VIIIB-2 and similar types may require dilution with additional ligand to impart greater stability, particularly for storage purposes. Thus, a ligand:Pt ratio greater than 1.5:1 may be needed for the internal dienic ligands of the instant invention, especially for complexes of type VIII and greater than 1:1 for complexes of type IX-XII. Again, as with Pt complexes, some excess of internal dienic ligands for greater complex stability may be required for the non-Pt metals (Ru, Os, Co, Rh, Ir, Ni and Pd) complexes as well.

In one embodiment, the siloxane- or ether-based ligand compounds of this invention, selected individually or in any mixture, may simply be added in low to moderate molar excess to a catalyst such as Karstedt's catalyst or Ashby's catalyst or to either the olefin or hydridosilane or hydridosiloxane component of the intended hydrosilylation components prior to reaction and the reaction then initiated by Karstedt's or Ashby's or another vinylsiloxane or allylic ether based catalyst or such a catalyst containing the siloxane- or ether-based ligands. The internal dienic ligand II (or IV, etc) would then provide the stability and activity needed for the Pt to show improved catalytic and/or product characteristics/performance.

In another embodiment, compounds of Formula III could be added to, e.g., the unsaturated substrate of hydrosilylation that utilizes a common Pt(II) or Pt(IV) compound, such as Speier's catalyst, for catalysis. In a second embodiment, the compounds of Formula III, singly or in any mixture could be added to a precatalyst such as chloroplatinic acid in alcoholic solution, at III:Pt ratio of 1:1 to 2:1, but recognizing that higher ratios may be needed for various purposes such as better storage or reaction rate control, temporary inhibition, etc. In a third embodiment a Pt complex of this invention such as XIVc/XVc (monomeric or dimeric) containing the ligand IIIc and chloride as the anionic ligand) could be directly employed as the precatalyst in place of Speier's catalyst, etc. On the basis of at least one internal dienic ligand in the formula of the complex, the non-Pt metals of this invention would require enough internal diene to provide at least a 1:1 ligand:metal ratio (not including other ancillary ligands on the metal), but a higher than 1:1 internal diene to metal molar ratio may be required to optimize discrete or in-situ complex formation (and/or to control reaction parameters) as noted for Pt below.

The ratio of the number of internal dienic ligand moieties to Pt atoms (above about 1.5:1 for complexes XIII (when p=0) and above about 1:1 for complexes XIV-XVII) could be used to control reaction rates and could possibly be also used to inhibit hydrosilylation, including in one-pot cure compositions), at or near room temperature but allow hydrosilylation to proceed at desirable rates at higher temperatures. This could be viable, even without any additional inhibitor classes, based on the lack of hydrosilylation of the internal olefinic moieties in the ligands of this invention. Thus, ligand:Pt ratios could vary from about 1:1 to 1000:1 or even higher, depending on the type of hydrosilylation, temperature, the type of the internal dienic ligand (for example, volatile, easily removed with heat, or not, etc.), and whether the internal dienic ligand exhibits substantial or a small inhibitory effect and the particular use/application. What may be an adverse (rate) effect in one situation may be a beneficial effect in another such as in controlled crosslinking. More than one internal olefinic diene could be used together for a particular hydrosilylation reaction. For crosslinking reactions, especially, but also for general hydrosilylation reactions, the internal dienic ligands could be premixed with the unsaturated compound or SiH compound or the Pt precatalysts such as Karstedt's catalyst, or may be added to the substrates or Karstedt's catalyst and mixed just prior to reaction. All of this could be determined via ordinary experimentation by those skilled in the art and would add greater versatility versus current terminal vinyl ligands.

Thus, catalysts of the instant invention could be advantageously used either directly or as in-situ compounds formed from suitable common Pt compounds/precatalysts (or precatalysts from the other metals of the instant invention) known in the art and ligands of this invention. It is to be noted that in this invention, the terms precatalyst and catalyst have been used interchangeably, although more and more the term precatalyst is used to mean a compound or complex from which the actual active catalyst forms in the reaction.

The concentration of platinum catalyst used in the present process could be varied as with common Pt catalysts for hydrosilylation. In one embodiment, the concentration of platinum would be from about 100 parts per billion (ppb) to about 100 ppm; from about 500 ppb to about 70 ppm; from about 1 ppm to about 50 ppm; even from about 2 ppm to about 30 ppm. Here as elsewhere in the specification and claims, numerical values can be combined to form new and alternative ranges. Concentrations of the other metal catalysts of this invention using ligands of this invention for a particular reaction may vary from about 5% w/w to about 1 ppm, and where relatively high concentration of metal is used, e.g., around 1 mol % as reported by Fantasia (cited above), the use of internal dienes may help reduce the level of metal catalyst needed, as the ligand would be expected to survive the intended transformation and be available for reformation/stabilization of the active metal center The platinum (or other metal) catalyst could be dissolved in solvent to improve ease of handling. The solvent is not limited and can be either polar or non-polar. Any solvent could be used in the method of the invention, as long as it facilitates the dissolution of the platinum/other metal catalyst, without deleterious effects.

The temperature range for the process of the hydrosilylation is from −50° C. to 250° C., preferably from 0° C. to 180° C. A variety of reactors can be used in the process of this invention. The process can be run as a batch reaction or a continuous reaction at ambient, sub-ambient, or supra-ambient pressures. In one embodiment, the reaction is carried out under an inert atmosphere. Selection is determined by factors such as the volatility of the reagents and products. Continuously stirred batch reactors are conveniently used when the reagents are liquid at ambient and reaction temperature. These reactors can also be operated with a continuous input of reagents and continuous withdrawal of hydrosilylated reaction product. With gaseous or volatile olefins and silanes, fluidized-bed reactors, fixed-bed reactors and autoclave reactors can be more appropriate.

Compositions and processes for forming cured or cross-linked products may include acure inhibitor. Examples of suitable inhibitors include, but are not limited to, ethylenically unsaturated amides, aromatically unsaturated amides, acetylenic compounds, ethylenically unsaturated isocyanates, terminal olefinic siloxanes or internal olefinic siloxanes such as those of the instant invention, unsaturated hydrocarbon diesters, unsaturated hydrocarbon mono-esters of unsaturated acids, unsaturated anhydrides, conjugated ene-ynes, hydroperoxides, ketones, sulfoxides, amine, phosphines, phosphites, nitrites, diaziridines, etc. Particularly suitable inhibitors for the compositions are alkynyl alcohols, maleates and fumarates.

The amount of inhibitor to be used in the compositions is not critical and can be any amount that will retard the above-described platinum catalyzed hydrosilylation reaction below and at room temperature while not preventing said reaction at moderately elevated temperature, i.e., a temperature that is 25 to 125° C. above room temperature. No specific amount of inhibitor can be suggested to obtain a specified bath life/shelf life at room temperature since the desired amount of any particular inhibitor to be used will depend upon the concentration and type of the platinum metal containing catalyst, the nature and amounts of SiH and the C—C unsaturated components. The range of the inhibitor component can be 0 to about 10% weight, about 0.001 wt to 2% by weight, even about 0.12 to about 1 by weight. Here as elsewhere in the specification and claims, numerical values can be combined to form new and alternative ranges. In one embodiment, the compositions can be free of any inhibitor component.

The composition may optionally further comprise one or more additional ingredients, such as filler, filler treating agent, plasticizer, spacer, extender, biocide, stabilizer, flame retardant, surface modifier, pigment, anti-aging additive, rheological additive, corrosion inhibitor, surfactant or combinations thereof.

Accordingly, in some embodiments, the present invention is also directed to the compositions produced from the above-described methods. These compositions contain the hydrosilylated products of the silylhydride/siloxyhydride and the compound having at least one unsaturated group. The hydrosilylated products that are produced by the process of the present invention have uses in the synthesis of silicone materials such as organosilanes for coupling agents, adhesives, products for agricultural and personal care applications, and silicone surfactant for stabilizing polyurethane foams as well as use as silicone materials such as elastomers, coatings, e.g., release liner coatings, for molding etc. When provided as a coating, the composition is coated onto at least a portion of a surface of a substrate. The amount of the surface coated with the coating composition can be selected as desired for a particular purpose or intended application. Release coatings are part of a laminate wherein a release coating is coated upon a substrate. Generally, substrates suitable for release coatings include, but are not limited to, paper, polymeric films such as those consisting of polyethylene, polypropylene, polyester, etc. The use of the present catalysts in coating compositions would be expected to provide particularly good curing in a short period of time including in about 10 seconds or less; about 7 seconds or less, even about 5 seconds or less. In one embodiment, curing can be effected in about 1 to about 10 seconds, 1 to about 5 seconds, even about 1-2 seconds. Further, the cured compositions would have good binding and may be anchored to substrates including, for example, to paper.

In another embodiment, as noted in the unsaturated substrate description, hydrocarbon-derived polymers (containing or without heteroatoms) with carbon-carbon double bonds and/or carbon-carbon triple bonds could also be substrates (either alone or in admixture with unsaturated siloxanes) for reaction with hydridosilanes and/or hydridosiloxanes where catalysts of the instant invention would be used.

The internal dienic ligands I and IIa of this invention could be prepared via several possible reaction schemes. In one embodiment such a scheme would constitute hydrosilylation of alkynes, such as propyne, 1-butyne, 2-butyne, 1-hexyne, 1-octyne, trimethylsilylacetylene, cyclooctyne, phenylacetylene and others with a hydridosilane such as a hydridochlorosilane or hydridoalkoxysilane or a hydridosiloxane. A product internal alkenylchlorosilane or alkenylalkoxysilane could then be hydrolyzed/cohydrolyzed/reacted with siloxanes with SiOH groups to dimers (IIa), or cyclic, linear and resin siloxanes IV-VII. For hydrosilylations with hydridosiloxanes, the internal ligands I would form directly from the reaction. One major advantage of direct hydrosilylation of C3 and longer chain alkynes would be that the product internal alkenes are no longer able to hydrosilylate at any reasonable rates to complicate synthesis of the desired olefinic product. Such a process to prepare useful internal alkenyl siloxanes has been described by Denmark and Wang, by Wu et al and by Spring et al as cited above and could be used to prepare ligands IIa of this invention. The methods described by Denmark, by Wu and by Spring may be preferred for internal dienes with E,E configuration. In fact, as this method utilizes $(Bu^t)_3PPt(DVDS)$ as catalyst (DVDS=1,1,3,3-divinyltetramethyldisiloxane), participation of the product internal dienic siloxane in the catalysis may well be involved and the equivalent catalyst based on a suitable product internal dienic siloxane may become a superior catalyst. For siloxane based internal dienic ligands, the reaction between a silyl- or siloxyhydride and a C3 or longer alkyne (or dialkyne) is the preferred method of preparing ligands, IIa (in cases, IIb) and IV-VII.

In a second embodiment, C3 and above terminal olefins could be coupled with hydridosilanes or hydridosiloxanes via dehydrogenative silylation using metal catalysts, especially transition metal catalysts, to produce ligands IV-VII. There are numerous examples of such reactions in the hydrosilylation literature (e.g., Marciniec, B., Ed. Comprehensive Handbook on Hydrosilylation; Pergamon Press: Oxford, England, 1992, and the review references therein). Ni, Ru, Pd, Rh and other metal catalysts are known to facilitate dehydrogenative silylation of various types of olefins (Coord. Chem. Rev. 2005, 249, 2374).

In a third embodiment, hydrosilylation of conjugated terminal dienes could be used to at first synthesize allylic silanes/siloxanes, which could then be isomerized using acidic/basic/thermal catalysis to the corresponding internal alkenyl-Si product either in silane or siloxane form.

In a fourth embodiment, bis(alkenyl)ether dienes IIb could be prepared via standard routes for the preparation of hydrocarbon ethers, such as reaction between internal allylic halides and salts of internal allylic alcohols (Williamson ether synthesis). Beta-silyl allylic ethers (VIIIbe, e.g.) could be prepared via direct hydrosilylation of dipropargyl ether. In yet another embodiment, internal dienic compounds III could be prepared via coupling/cross-coupling of internal alkenyl halides or other suitable internal alkenyl substrates, either using acid/base/transition metal catalysts or via electrochemical synthesis or a combination of both (JACS, 2018, 140, 2446; J. Org. Chem. 2000, 65, 4575). Grignard synthesis (Mg coupling of allylic halides, e.g.) could also be used for some ligands of the type III.

EXAMPLES

General Experimental Information

The following examples are intended to illustrate, but in no way should be construed as limiting, the scope of the present invention. All parts and percentages are by weight unless stated otherwise. All publications, patents and patent applications referred to in the instant application are incorporated herein by reference in their entirety. It will be understood that conditions and amounts of reactants in particular and other ingredients may vary slightly to moderately. Certain results are described based upon expected behaviors as grounded in scientific theory as would be appreciated by a person of skill in the art.

Reagents are/were obtained from commercial sources and tested for quality if needed. Those commercially unavailable are/were readily synthesized by a person of skill in the art. Most reactions involving air/moisture sensitive reagents/products are/were run under nitrogen using, for example, Schlenk-line techniques. Chloroplatinic acid catalyst would be used as an alcoholic (C2 or higher alcohol) solution and Karstedt's catalyst would be obtained commercially or prepared according to published procedures. Preferred Pt concentration for these standard catalyst solutions would be 2-10% w/w but, occasionally, higher concentration of Pt may be needed to reduce solvent use, etc. Substrate olefin: SiH molar ratios would mostly vary between 1.10:1 and 1:1 for non-cure hydrosilylation reactions, but for cure reactions SiH molar levels could be in excess over olefin to speed up reaction and/or complete cure with respect to no or little residual olefin.

Karstedt's catalyst is abbreviated as Cat. K and modified Karstedt's type catalysts of this invention are abbreviated as Cat. K+ specific internal diene such as IIag, etc., when prepared in-situ from Karstedt's catalyst, and Cat. VIIIag, etc., when prepared directly from internal dienes of the instant invention with/without the use of Karstedt's catalyst directly and isolated/characterized as discrete catalysts.

General Set Up and Conditions

A general equipment set up for hydrosilylation would constitute a 250 mL-1 L (or smaller) 3-4 neck round bottom flask, equipped with an alcohol thermometer or a thermocouple temperature probe (such as a J-Chem probe), a magnetic or mechanical stirrer, addition funnel topped with a $N_2$ inlet, water condenser (topped with a dry-ice condenser, for volatile/low-boiling reagents), and an exit adapter connected with a t-piece to the $N_2$ line, a bubbler whose exit is passed through a scrubber (as an option for certain silanes) filled with KOH/ethanol solution to quench any $SiH_4$ that forms from the reaction and a heating mantle/silicone oil bath. Typically, the SiH compound would be loaded in the additional funnel with the alkyne/alkene in the flask (regular addition). For inverse addition (which could be beneficially used for the preparation of ligands of this invention directly from hydridosiloxanes), the SiH compound would be in the flask with the alkyne in the addition funnel or sparged under the SiH component as a gas. The apparatus would be purged with dry nitrogen before charging with reactants and a low flow of nitrogen would be maintained throughout the reaction (and further processing), as needed. For the preparation of some ligands using gaseous alkynes, or for gaseous alkyne/alkene hydrosilylation using catalysts of this invention, a gas sparger would be used to introduce the gaseous substrate into the flask subsurface as small bubbles within the SiH component (in solution as necessary). Reaction temperatures can vary widely for hydrosilylation, but often a reaction temperature is maintained between 60 and 90 Celsius, once initiation occurs, though temperatures between 100 and 150+ Celsius to main reaction are not uncommon. Temperatures closer to room temperature may sometimes be advantageously used for low-boiling reactants or to control product selectivity. Those skilled in the art will know to adjust temperatures based on reactant volatility, sensitivity, etc., as well as probing experiments in the laboratory. Further, an inert solvent such as dry toluene/xylenes may be needed for some H-Siloxane fluids (H-Siloxane=siloxane oligomers/polymers with SiH groups in the backbone and also sometimes at the termini as well), resins, etc. Catalysis using supported catalysts could be carried out in a solvent such as toluene/xylenes where the catalyst forms a slurry. Or, the supported catalyst may be used in fixed/packed bed reactors, even on a smaller scale on pilot-type laboratory reactors.

To catalyze the hydrosilylation reactions for the preparation of the internal olefinic/dienic ligands (e.g., those shown in Table I), the phosphine-based platinum catalyst as described by the authors above is preferred (at the recommended level of Pt) for the E,E-internal dienes. However, either Speier's catalyst preferably in isopropanol, 1-butanol or cyclohexanol solution or Karstedt's catalyst may be used to obtain the geometrical isomeric mixtures noted above which can then be separated into the individual product components via fractional distillation, chromatography, etc. Pt concentrations 2-5 ppm w/w should suffice for most general hydrosilylation reactions, except for specialized reactions such as for the preparations of IIa and others with E,E-configuration as noted and for release liner cure. It may be beneficial to add 2 mol % of the alkyne (based on reaction stoichiometry to the SiH compound in the flask (if using the inverse mode of addition), followed by catalyst addition through a rubber septum to the preheated flask (50-60° C.). Once an exotherm is noted, cyclooctyne/1-hexyne/1-octyne, etc., addition should continue and the temperature maintained at the noted levels. For the gaseous alkynes, sparging should preferably be started before addition of catalyst to the flask. Importantly, it will be recognized that once a small quantity of the internal dienic ligand is formed in the hydrosilylation mixture, it would be expected to provide one or more of the beneficial characteristics (including stabilization of the active Pt center) that are the expectations of the instant invention. However, based on the inventive expectations of the present invention, as the concentration of the internal diene product builds up in the reaction vessel, it is possible that reaction rate may slow once sufficient internal diene has formed, since now the concentration effect of the product (which would not hydrosilylate) could have a retarding effect on the catalyzed reaction rate and this (which is a predicted advantageous inventive value for cure for example) may require the use of a higher loading of Pt to complete reaction vs. the typical 2-5 ppm noted above. Alternatively, the product internal olefin or diene could be continuously removed from the reaction to reduce a serious negative rate effect. Alkyne reaction rate with SiH would likely still win in most cases (success of internal diene synthesis as noted in references above), but any catalyst level adjustment needed would be determined by experimentation. Reaction details pertinent to this invention are described e.g., in U.S. Pat. Nos. 8,524,262 and 9,434,749 and in the publications from Denmark, from Wu and from Spring noted above which are incorporated herein in their entirety by reference.

Preparation of Internal Dienic Ligands IIab-ah, IIbe, IVa-2, IVb-1, Vf, Vg, HSL-1a-3a

TABLE I

| Dienic Ligand | Alkyne | SiH compound, exemplary solvent | Addition mode | Temperature Range/Time | Expected Yield |
|---|---|---|---|---|---|
| IIab | Cyclooctyne | $M^HM^H$ | Regular or Inverse | 50-90 C./1-2 h | Good-high |
| IIac | Propyne | $M^HM^H$ | Inverse | 50-80 C./loaded SiH consumption time | Good |
| IIad | 1-butyne | $M^HM^H$ | Inverse | 50-80 C./loaded SiH consumption time | Good-high |
| IIae | 1-hexyne | $M^HM^H$ | Regular or Inverse | 30-80 C./1-3 h (dry ice condenser) | Good-high |
| IIaf | 1-octyne | $M^HM^H$ | Regular | See References using $(Bu^t)_3PPt(DVDS)$ catalyst | High |
| IIag | Trimethylsilyl acetylene | $M^HM^H$ | Regular | See References using $(Bu^t)_3PPt(DVDS)$ catalyst | High |
| IIah | Phenyl acetylene | $M^HM^H$ | Regular | See References using $(Bu^t)_3PPt(DVDS)$ catalyst | High |
| IVa-2 | Trimethylsilyl acetylene | $(D^H)_4$ | Inverse | 30-80 C./ using catalyst as for IIag, toluene solvent | Good-high |
| IVb-1 | Cyclooctyne | $(D^H)_4$ | Regular or Inverse | 60-100 C./1-3 h | Good |
| Vf | 1-octyne | H-Siloxane-1 | Inverse | SiH consumption time Phosphine-Pt catalyst as for IIag | Good-high |
| Vg | Trimethylsilyl acetylene | H-Siloxane-1 | Inverse | 30-80 C./SiH consumption time Same catalyst as for IIag | Good-high |
| HSL-1a | Cyclooctyne | SiH-functional silica slurry in dry toluene | Inverse. May need heating together | 60-110 C./Surface SiH not detected by IR | Good |
| HSL-2a | Trimethylsilyl acetylene | SiH-functional silica slurry in dry toluene | Inverse or heating together | 50-80 C. until surface SiH not detected by IR. Catalyst as for IIag | Good |
| HSL-3a | 1-octyne | SiH-functional silica slurry in dry toluene | Inverse or heating together | 40-80 C. until surface SiH not detected by IR Catalyst as for IIag | Good |
| IIbe | Dipropargylether | Triethylsilane | Regular | Catalyst as for IIag | Good-high |

Table I notes:

(1) $M^HM^H$ = 1,1,3,3-tetramethyldisiloxane, $(D^H)_4$ = 1,3,5,7-tetramethylcyclotetrasiloxane.

(2) Ligands IIba-IIbe could be prepared via standard Williamson ether synthesis procedures from the corresponding allylic chlorides and allylic alcohols.

(3) Internal dienic compounds III could be prepared via coupling/cross-coupling of internal alkenyl halides or other suitable internal alkenyl substrates, either using acid/base/transition metal catalysts or via electrochemical synthesis or a combination of both (JACS, 2018, 140, 2446; J. Org. Chem. 2000, 65, 4575). Compounds such as IIIc and IIIcc could be prepared via Mg coupling of the corresponding sym-allylic chlorides (as is used for 1,5-hexadiene synthesis, e.g.)

(4) IVa-2 represents the cyclotetrasiloxane ligand with the linear internal olefinic substituent $Me_3SiCH{=}CH$— group on Si while IVb-1 represents the cyclotetrasiloxane ligand with alpha-cyclooctenyl as the olefin substituent on Si.

(5) H-Siloxanes are siloxanes containing (at least some) H-Si or hydridosiloxane units, and can be linear, cyclic, or branched. For Vf and Vg, a linear H-siloxane (with high His content) such as that described in Example 5, U.S. Pat. No. 8,524,262 can be used.

(6) SiH-functional silica, as described in Table I, can be prepared using hydrophilic silica such as Cabo-O-Sil ® M7D and surface-treating it with sym-tertramethyldisilazane, followed by hexamethyldisilazane, if desired. Or, $SiCl_4/Si(OEt)_4$ and $HSiCl_3/His(Oet)_3$ may be cohydrolyzed to produce SiH-functional silica. This silica (the latter process silica is preferred) is then used to prepare the internal diene/olefin-functional silicas HSL-1a, HSL-2a and HSL-3a. All the silica examples may require using the t-Bu-phosphine-based Pt catalyst as noted for IIaf and others.

TABLE I-continued

| Dienic Ligand | Alkyne | SiH compound, exemplary solvent | Addition mode | Temperature Range/Time | Expected Yield |
|---|---|---|---|---|---|

(7) Alternatively, and less preferably equivalent HSL-1b, HSL-2b and HSL-3b silicas could be prepared via direct surface treatment of SiOH-functional silica (or OH-functional alumina, titania or ceria) with disilazanes containing alpha-cyclooctenyl-, $Me_3SiCH$=CH— and alpha-octenyl substituents, respectively, via reaction at surface SiOH groups,. These would lead to M'T, Si—O—Al, Si—O—Ti, Si—O—Ce structures, respectively, at the surface of the treated supports. Such longer internal dienic ligands at the surface would likely bind less strongly to metal, in more of a mono-alkene binding mode. The disilazanes could be made from the equivalent chlorosilanes via reaction with ammonia, as is used commercially to make hexamethyldisilazane and other common disilazanes. Chlorosilanes for this purpose would be made via hydrosilylation of the equivalent alkynes (in this case, cyclooctyne, trimethylsilylacetylene, and 1-octyne) with $Hme_2SiCl$. Less preferably, the surface treatment of the hydrophilic silica could also be achieved using equivalent disiloxanes (made from the chlorosilanes) in the presence of isopropanol. Treatments of Cab-O-Sil ® M7D and similar silicas, and other metal oxides, as described in U.S. Pat. No. 5,595,593 (which is incorporated herein by reference in its entirety) constitute common procedures and could be used to prepare the functional silicas described in this invention.
(8) Thus, multiple options are potentially available for the preparation of high-surface area catalyst grade silica (or alumina or titania or ceria) that contain the internal-diene/internal-olefin groups of the instant invention.

It is to be noted that even though using Karstedt's or Speier's type Pt catalysts for the synthesis of ligands IIa, IV-VII does not yield internal diene isomers with high geometric purity such as E, E or Z, Z of the 3 geometric isomers possible with symmetrical dienes, high purity and high yield synthesis of the E, E-dienes of this invention can be accomplished using the $Bu^t$-phosphine-based Pt complex, as described by Denmark, by Wu and by Spring in the references noted above. (Z,Z) and (Z,E) isomers from Speier's or Karstedt's complex catalyzed reactions may be isolated via distillation or chromatographic means and then tested for complex formation with Pt and non-Pt metals of this invention. The preferred catalyst for synthesizing the siloxane based (E,E) dienes is $(Bu^t)_3$PPt(DVDS), where DVDS=1,3-divinyl-1,1,3,3-tetramethyldisiloxane.

The following experiments describe the preparation of the dienic ligands IIaf, IIag, and IIbe.

Preparation of $(Bu^t)_3$PPt(DVDS); (See Reference Above by Spring et al)

An oven-dried 25 ml RB flask and stir bar was charged with $Pt_2(DVDS)_3$ (2% Pt, in xylenes, 3.0 g) and placed under nitrogen. The (t-Bu)3P (0.62 g) was added via syringe and the mixture was stirred at room temperature overnight.

Ligand IIaf

An oven-dried 15 ml 3-necked flask, equipped with stir bar, condenser and addition funnel, was charged with 1-octyne (4.9 g, 44.9 mmol) and cooled in an ice bath under nitrogen. The $(t-Bu_3P)$PtDVDS catalyst (0.53 g) was added, followed by a portion of the 1,1,3,3-tetramethyldisiloxane (0.3 ml of 3.4 ml). The cooling bath was removed and an additional 0.2 ml of the tetramethyldisiloxane was carefully introduced via addition funnel. The resulting exotherm was controlled with the cooling bath keeping the temperature below 30° C. The remainder of the tetramethyldisiloxane was added dropwise, again keeping the internal temperature below 30° C. Upon complete addition, the reaction was allowed to stir at room temperature overnight. A portion of crude IIaf (3 g) was purified via flash silica column chromatography using CombiFlash (100 g SiO2, hexane), to yield a liquid that was approx. 85% E,E and 15% Z,Z by H-NMR (trans $3J_{HH}$ coupling constant 19 Hz)

Ligand IIag

An oven-dried 25 ml 3-necked flask, equipped with stir bar, condenser and addition funnel, was charged with trimethylsilylacetylene (6.1 ml, 42.0 mmol) along with $(t-Bu_3P)$ PtDVDS (0.49 g) under nitrogen. The addition funnel was charged with 1,1,3,3-tetramethyldisiloxane (3.6 ml, 20.0 mmol). The tetramethyldisiloxane was added in a dropwise manner controlling the resulting exotherm with a cooling bath and maintaining the temperature below 30° C. Upon complete addition, the reaction was stirred at room temperature overnight. A portion of the crude product was purified twice via Column chromatography, as above, to provide a clear liquid of composition approx. 80-85% E,E isomer and 20-15% Z,Z isomer by H-NMR (trans $3J_{HH}$ coupling contant 23-24 Hz.)

Ligand IIbe

A 15 ml 3-necked flask, equipped with stir bar, condenser and addition funnel, was charged with propargyl ether (2.1 g, 22.0 mmol) and (t-Bu3P)PtDVDS (1.3 g) under nitrogen. The addition funnel was charged with triethylsilane (4.7 g, 40.0 mmol). The triethylsilane was added in a dropwise manner controlling the resulting exotherm with a cooling bath maintaining the temperature below 30° C. Upon complete addition, the reaction was stirred at room temperature overnight. A portion (3 g) of the crude clear liquid product was purified once as for the two ligands above. via CombiFlash (100 g SiO2, 100% hexane/5% DCM/hexane) to provide a clear liquid with 100% E,E configuration (trans $3J_{HH}$=19 Hz).

As noted earlier in the specifications, internal dienic ligands III could be prepared via various coupling methods in the literature for alkenyl and allylic systems. For example, magnesium metal coupling of crotyl chloride would produce dienic ligand IIIc. Here, starting with a particular geometrical isomer should lead to the diene of the same isomer.

Preparation of Pt Complexes of the Type VIII-XII, XIV-XVII and Supported, Heterogeneous Versions General Set Up and Conditions Apparatus set up for the synthesis of complexes would often be similar to that described above for ligand synthesis, except that smaller volume flasks would be used for the expectedly smaller scale Pt complex preparation for use as catalysts. Dry/dried solvents would be used in preparation and for purification and often Schlenk techniques may be required, with reactions run under nitrogen/argon atmosphere though many of the complexes would be expected to be air stable at least for significant periods of time.

Two alternate procedures could be utilized for many of the siloxane and ether based dienic ligands for Pt complex synthesis/preparation.

Internal dienic siloxane-based complexes would involve initial preparation of a Karstedt's catalyst or it's cyclosiloxane (or longer-chain siloxane) equivalents, followed by addition of the ligands (in molar excess) of the instant invention in simple displacement type reactions, followed by removal of the more volatile vinylsiloxane based ligands via fractional distillation if needed under reduced pressure.

For internal dienic ether based complexes, a vinylsilane or vinylsiloxane could be used as a reducing agent first for Pt(IV) and Pt(II) compounds, in the presence of excess internal dienic ether ligands of this invention. If stability of complexes of type VIII are found to be too low for practical use as direct catalysts, or for extended storage, the prevalent practice of using excess divinyldiloxane, vinylcyclosiloxane or vinyl-terminated short-chain siloxane fluid to stabilize Karstedt's type catalyst to storage may be adapted for complexes VIII of this invention, i.e., instead of excess vinylsiloxane, excess internal dienic siloxane or dienic ether (including polyethers with internal olefins and both chain ends would be used. It is a crux of this invention to stress at this juncture, as an important embodiment, that in many cases for internal dienic ligands of this invention, it may not be necessary to store the Pt complexes, but to indirectly generate the desired active complexes in situ, via simply adding the appropriate ligands II, IV, etc., to vinylsiloxane based catalysts such as Karstedt's with any needed excess internal dienic ligand.

The direct preparation of Pt complexes of the type VIII based on siloxane ligands could be accomplished in much the same way as for the preparation of Karstedt's catalyst and cyclic siloxane equivalents (based on the teachings of U.S. Pat. Nos. 3,775,452, 5,175,325 and European Patent application NO 0979837A2 which are incorporated herein in their entirety by reference), except that a vinylsilane or vinylsiloxane would be used as a reducing agent in the presence of excess IIa, IVa or IVb e.g., to generate the Pt complexes, either neat or in a suitable polar or non-polar solvent to keep the complex in solution. As noted above, if the pure or essentially pure complexes are found to be too unstable, even in the presence of excess internal dienic ligand, they may be directly converted to complexes of the type IX and XI. For ether-based complexes of the type VIIIba, and one based on the ligand IIbe (VIIIbe), a procedure similar to that described by Marko in Organometallics 2007, 26, 5731 (which is incorporated herein in its entirety by reference), could be used with $MD^{Vi}M$ as the reducing agent, with excess internal dienic ether IIba and IIbe, respectively. As with the siloxane equivalents above, based on stability observations with the pure ether-based complexes, the crude complexes could be converted in situ to ones of the type X or XII for use as catalyst. In another embodiment, for the synthesis of complexes, X-XII, second possibility is to first synthesize the equivalents based on $M^{Vi}M^{Vi}$ and then add the internal dienic ligands II of this invention in measured excess to displace the $M^{Vi}M^{Vi}$, with the corresponding ligand II.

Complexes of the type XIV-XVII could potentially be prepared from suitable Pt(II) precursors such as (1,5-hexadiene)$PtCl_2$, Zeise's salt, $Pt(acac)_2$, (norbornadiene)$PtCl_2$, $CODPtMe_2$ and other similar Pt(II) precursors and replacing the terminal diene ligand (or cyclodiene ligand) with the internal diene ligand of the present invention via simple exchange chemistry employing concentration and temperature type effects. (1,5-hexadiene)$PtCl_2$ can be conveniently prepared from allyl chloride as described in Inorg. Chim. Acta 2010, 364, 272 which is incorporated herein by reference in its entirety. Thus, using crotyl chloride in the above reaction in place of allyl chloride would directly lead to a complex of Formula XIV/XV (XIVc/XVc) where the internal diene is 2,6-octadiene (IIIc) and X is chloride. In another embodiment, Speier's catalyst solution or $K_2PtCl_4$ in alcoholic solution could be used with addition of Dienes III to prepare complexes of the type XIV-XVII.

As will be understood by those skilled in the art, complexes of the type equivalent to XIV-XVII for the non-Pt metals of the instant invention could be prepared from equivalent starting compounds such as $K_2PdCl_4$, (COD)$PdCl_2$, $RuCl_3$, $Ru(acac)_3$, $(Ph_3P)_4RuCl_2$, $RhCl_3$, $IrCl_3$, $[Ir(COD)Cl]_2$, etc., and the internal dienes (III, and potentially in some cases I) of this invention. Numerous 1,3-, 1,4-, and 1,5-diene complexes with cyclodienes as well as terminal dienes are known for these metals. It is then anticipated the internal dienes of this invention would lead to complexes with these metals, often via simple displacement reactions, that fit the approximate Formula XVIII to provide new and novel compounds for a range of catalyzed reactions. In this context, many of the non-Pt metals of this invention form dimeric complexes and some dimeric complexes of these metals containing the internal dienic ligands (either via eta-2-eta-2 or via eta-4 bonding to metal) would also be expected. Where stable, discrete complexes of these metals are not isolatable, the in situ process may be used for catalyzed reactions using these metals.

General Procedures for the Synthesis of Several Siloxane Ligand-Based Pt Complexes of Type VIII A Karstedt's catalyst concentrate would be prepared as described in Examples such as 3 of U.S. Pat. No. 5,175,325, but scaled as needed to provide enough complex to cover the synthesis of several complexes of the type VIII. To a suitable aliquot of the crude Karstedt's complex, ligands IIab-IIah would be added in Schlenk-type apparatus as described above and under a $N_2$ or Ar atmosphere, and using solvents such as dry toluene/THF as necessary. Exploratory ligand:Pt molar ratio for the syntheses could be 50:1 or higher to even 3:1. Heating may be required to exchange the divinyldisiloxane ligand for the internal dienic siloxane ligands, followed by removal of the vinylsiloxane ligand and any solvent under reduced pressure. Again, at the end, a molar excess of the new internal dienic ligand may be required to stabilize the new complexes. Further, to prepare catalyst "solutions", low viscosity siloxane fluids terminated with the same internal olefin as present in the dienic ligand for the complex could be employed in much the same way as for Karstedt's catalyst (see Example 4 of above US Patent.)

To prepare cyclic siloxane complexes from ligands of the type IV, one of two procedures could be used. In the first, Karstedt's catalyst as prepared above could be added to preferably ligands such as IVa-2 or IVb-1, such that the alkenyl groups on the cyclosiloxane to Pt ratio is about 2:1-3:1 to allow for an excess of the ligand moieties to be present in the complex vs. a theoretical 1.5:1 ratio based on the Karstedt's complex structure. The exchanged and any excess $M^{Vi}M^{Vi}$ would then be removed under reduced pressure which may also drive the complexation of Pt to the alkenyl ligands on the cyclosiloxane. In the second, $MD^{Vi}M$ would be used as the reducing agent initially for the Pt(IV) or Pt(II) halide (as for the preparation of ether-based complexes VIII) in the presence of the cyclosiloxane ligand or followed by the addition of the cyclosiloxane ligand, using the same ratio of ligand to Pt of 2:1-3:1. U.S. Pat. No. 3,715,334 discloses an example of using a vinylcyclotetrasiloxane, $(D^{Vi})_4$, directly for the preparation of a Pt complex (and this patent is incorporated herein in its entirety by reference), but this method may not be economical for the instant invention and/or the internal alkenylsiloxane ligands may not act at all or act poorly as reducing agents for Pt(IV) or Pt(II)—which is not known at this time.

For the non-Pt metals of this invention, either Karstedt's complex equivalents (where possible, such as for Pd and Ni) or other M(0) complexes, potentially olefin/carbonyl/organophosphine complexes, could be used as starting materials, together with Ligands, II, IV, etc.

Heterogeneous catalysts based on the internal dienic ligands of this invention could also be prepared in one of two simple ways. In the first, Karstedt's catalyst concentrate would be added to a slurry or suspension of the functionalized silica HSL-1a, HSL-2a or HSL-3a e.g., in a suitable solvent (perhaps in the presence of some free equivalent ligands of this invention that are also volatile), using the above principle of a higher ligand to Pt ratio vs. theoretical. Mild-moderate heating (below 80° C., preferably) and extended reaction times may be required to effect good exchange in a two-phase reaction. Again, removal of the $M^{Vi}M^{Vi}$ (and any excess internal diene) under reduced pressure would facilitate conversion to the Pt complex on the support. In a second method, Pt complexes such as VIIIae/VIIIaf/VIIIag/VIIIah could be added to silica-based ligands such as HSL-1a, HSL-2a or HSL-3a (or HSL-1b, HSL-2b or HSL-3b) and the reaction carried out as above in a slurry/suspension followed by reduced pressure removal of the exchanged free (unbound) ligands. Such catalysts could be named Pt-on-HSL-1a, 2a and 3a, etc., respectively, where HSL signifies heterogeneous silica ligand (support). The first method is preferred.

Pt analysis could be performed using atomic absorption spectroscopy or ICP analysis. Further, multinuclear NMR analysis (including Pt-195 NMR) could be employed to elucidate the new Pt complex structures.

As noted above, if any of the new Pt complexes does not have reasonable stability, attempts could be made to add electron-deficient ligands such as dimethyl maleate/fumarate to convert these to more stable complexes of the type IX/IXa/IXb or to NHC complexes of the type XI, in situ. In fact, even for complexes where the stability is good, the synthesis of complexes IX/IXa/IXb and XI could be piggybacked by dividing the initial complexes VIII into portions and adding either electron-deficient olefins or the NHC component. Again, as with supported Pt complexes of this invention, other M(0) supported complexes of the noted non-Pt metals could be prepared via analogous or slightly modified methods by those skilled in the art.

General Procedures for the Synthesis of Several Ether Ligand-Based Pt Complexes of Type VIII For the synthesis of internal dienic ether (IIb) based Pt complexes, it may be convenient to use a procedure adapted from Organometallics 2007, 26, 5731 (which is incorporated herein in its entirety by reference) that details the initial preparation of the allyl ether based complex $Pt_2(allyl_2O)_3$ (via use of $MD^{Vi}M$ as reducing agent for Pt(IV) or Pt(II) on the way to the corresponding $Pt(allyl_2O)(NHC)$ complex. Internal dienic ethers of the instant invention would be substituted for allyl ether in that procedure. Obviously, experimental condition adjustments would be needed to prepare the internal dienic ether complexes of this invention, such as from ligands IIba and IIbe. It may be necessary to directly convert these straight ether complexes to those of the type X/Xa/Xb and XII in situ, as also described in the experiments of the above publication. However, it is possible that a complex such as VIIIbe may have greater stability imparted by the Si substituent on the olefin for the straight ether complex which would be further enhanced via synthesis of a complex of the type X/Xa/Xb or XII from VIIIbe.

It is expected that all synthetic procedures for the preparation of complexes VIII and supported versions could be performed by those skilled in the art. Similarly, sufficeth to say, equivalent/similar methods could be followed for the preparation of equivalent complexes with non-Pt metals of this invention.

General Information on Hydrosilylation Reactions Using Pt Complexes of the Instant Invention Apparatus set up and conditions for most or many cases would be identical or similar to that described at the beginning of the Examples section.

Catalysis could be carried out in many cases via one of two procedures: use of ligands of the type II/IV/V, etc., of the instant invention as additives, together with Karstedt's type catalysts (or possibly even Speier's type catalysts in cases) or the direct use of Pt complexes of the instant invention. For ligands of type III and perhaps even IIb, the additive mode could possibly be a preferred mode (based upon experimentation) in cases, although the use of complexes of type XIV-XVII directly may also be possible, especially where solubility/compatibility with reaction ingredients is enhanced from the substituents on the internal dienic ligands. In one embodiment, ligands of the type III and complexes of the type XIV-XVII would be used in conjunction with or in place of Pt(IV/II) catalysts such as Speier's catalyst, respectively. In another embodiment, catalyzed reactions could be performed via the additive method using ligands III and common salts or compounds of the non-Pt metals of this invention, if direct internal diene complexes are too unstable or not accessible. In a further embodiment, complexes of Formula XVIII, containing internal dienes of this invention could be used directly as catalysts.

TABLE II

Representative hydrosilylation examples using catalysts/additive methods of this invention

| Example Number | Olefin | SiH | Method: Regular(R) or Inverse(I) Addition, Ligand Additive or Direct Catalyst | | Comparative catalyst: Karstedt's or other | Pt loading, ppm, % w/w of olefin |
|---|---|---|---|---|---|---|
| 1 | 1-octene | $HSi(OEt)_3$ | R | Cat K + IIaf | Cat K | 0.5-2 |
| 2 | 1-octene | $HSi(OEt)_3$ | R | VIIIag | Cat K | 0.5-2 |
| 3 | Allyl glycidyl ether | $HSi(OEt)_3$ | R | IIIc + $H_2PtCl_6$/IPA | $H_2PtCl_6$ in i-PrOH or EtOH | 3-4 |
| 4 | Allyl-PEG | $MD^HM$ | Part mixture + R | IIIc + $H_2PtCl_6$in i-PrOH or EtOH | $H_2PtCl_6$ in i-PrOH or EtOH | 2-4 |

TABLE II-continued

| Representative hydrosilylation examples using catalysts/additive methods of this invention | | | | | | |
|---|---|---|---|---|---|---|
| Example Number | Olefin | SiH | Method: Regular(R) or Inverse(I) Addition, Ligand Additive or Direct Catalyst | | Comparative catalyst: Karstedt's or other | Pt loading, ppm, % w/w of olefin |
| 5 | Allyl-PEG | $MD^HM$ | Part mixture + R | Cat K. + IIag | Cat K | 2-4 |
| 6 | Allyl methacrylate | $Me_2HSiCl$ | R | IXb-1 Cat complex from VIIIag + dimethyl maleate | Cat K. | 0.5-2 |
| 7 | (1) Methylstyrene (2) Alpha-olefin (3) Allyl-PEG | H-Siloxane | I | IIaf + Cat K* | Cat K* | 5-15 |

Table II notes:

(1) Hydrosilylation experiments in the table may be based on the examples cited in U.S. Pat. Nos. 9434749, 10047108 and 8524262 (for Example 7 in particular). Most could be run following the experimental detail described in these patents in equivalent examples, with scale and minor conditions adjustments. The teachings of the above patents are incorporated herein in their entirety by reference.

(2) For examples 4 and 5, about 20% of the $MD^HM$ would be preloaded together with the allyl-PEG. Following the exotherm, addition of the remaining $MD^HM$ would be continued from the dropping funnel, as described in the referenced patent.

(3) Allyl-PEG refers to monoallyl-terminated polyethylene glycol in the examples.

(4) Cat K* is a specific version of the Karstedt's catalyst where a small amount of alpha-methylstyrene is added to Karstedt's catalyst, as noted in the respective patent above.

(5) Methylstyrene refers to alpha-methylstyrene in the examples.

(6) For Example 7, the alpha-olefin could be a C-6 to C-26 terminal olefin, and the molar ratios of the three unsaturated compounds could be varied for particular purposes. In one embodiment the alpha-olefin is 1-octene, and in two others the alpha-olefin are 1-dodecene and 1-octadecene, respectively.

Representative Coupling Examples Using Catalysts/Additive Methods of this Invention (1) Examples of C—N coupling reactions could be carried out using the teachings of Fantasia, et al., in Organometallics 2021, 40, 2384 (which is incorporated herein in its entirety by reference. Equivalents of one or more Pd complexes in Table 1 of the publication could be prepared using ligands II of this invention in place of sym-divinyltetramethyldisiloxane, and then used in reactions described in Scheme 2. Alternatively, one or more ligands II of this invention could be used in conjunction with one or more Pd complexes in Table 1 for in situ reactions of Scheme 2.

(2) Examples of C—C type coupling reactions could be carried out by following teachings of Beller etal., in Chem. Commun. 2000, 2475, using the internal diene ligands of the instant invention in place of sym-divinyltetramethyldisiloxane.

For examples of hydrosilylation cure experiments with siloxanes, the teachings of U.S. Pat. Nos. 10,513,584, 10,000,611 and U.S. patent application Ser. No. 15/502,325, addressing an application that consumes a large chunk of all Pt used for hydrosilylation in industry, namely release coatings, could be followed. DSC experiments could be used as guides for initial results of catalyst performance, followed by any accessible coater experiments. Table III lists some catalysts of the instant invention, both in the additive mode and as discrete complexes, that could be examined for this vital application that is ubiquitous in daily life, from self-adhesive postage stamps to labels across wide swaths of industrial and consumer products and containers.

TABLE III

| Representative hydrosilylation-based cure examples using catalysts/additive methods of this invention | | | | | |
|---|---|---|---|---|---|
| Example Number | Vinyl siloxane | Crosslinker siloxane | Catalyst (additive mode or direct complex) | Pt loading, ppm, based on total wt. of formulation | Comparative catalyst |
| 1 | SilForce ™ SL 6900 | SilForce ™ SL 6020 | Cat K + IIaf or IIag | 10-30 | Cat K |
| 2 | SilForce ™ SL 6900 | SilForce ™ SL 6020 | VIIIaf or VIIIag | 10-30 | " |
| 3 | SilForce ™ SL 6900 | SilForce ™ SL 6020 | IXb-1, | 10-30 | " |
| 4 | SilForce ™ SL 6900 | SilForce ™ SL 6020 | Cat. K + IIbe | 10-30 | " |

TABLE III-continued

| Representative hydrosilylation-based cure examples using catalysts/additive methods of this invention | | | | | |
|---|---|---|---|---|---|
| Example Number | Vinyl siloxane | Crosslinker siloxane | Catalyst (additive mode or direct complex) | Pt loading, ppm, based on total wt. of formulation | Comparative catalyst |
| 5 | SilForce ™ SL 6900 | SilForce ™ SL 6020 | VIIIbe or Complex from VIIIbe and dimethyl maleate | 10-30 | " |

Table III notes:

1 SilForce ™ is a Trade Mark of Momentive Performance Materials.

2 Catalyst solution with catalysts of the instant invention could be made in xylene(s), as described in above patents for inventive catalysts therein. As indicated above, deliberate, small or larger excesses of the respective internal dienic ligand could be used to stabilize the cure catalyst and/or to use concentrations that allow "command"/controlled cure.

3 It will be understood that the above examples are but a very small sliver of cure experiments and formulations with siloxane substrates and by no means should be viewed as restrictive/limiting with respect to use of the compounds and complexes of this invention broadly in hydrosilylation-based cure. For example, 1-hexenyl substituted siloxane could be used as the unsaturated component of cure, and various mixtures of unsaturated fluids and SiH-crosslinkers, or their respective copolymers, of a wide variety together with various performance additives could be used for release coating cure formulations. Cure is not limited to siloxanes substrates only, but could be accomplished for organic polymers using SiH-functional siloxanes and catalysts of this invention.

4 Some of the formulation inhibitors typically used with the above type of cure to gain shelf life at ambient temperature are described in the above patents and could also be used with the examples of this invention in Table III.

The prepared and purified dienic ligands IIaf, IIag, and IIbe were used in-situ for the following examples. Most of the reactions were run in a pseudo-limiting-reagent (olefin) mode where examples and comparative examples were also run under essentially identical conditions of temperature and limited reaction time, to tease out any product composition differences and catalyst activity. Further, because of the small scale of the reactions, requiring very small volume of catalyst solution, a 2% Pt w/w, Karstedt's catalyst in xylenes was used to allow greater accuracy/precision of catalyst solution withdrawal and addition using 10-100 microliter gas tight syringes, in place of higher viscosity Karstedt's catalyst solution in vinyl siloxane fluid. In some instances, the catalyst solution was further diluted with dry toluene to ensure accuracy via larger volume use. Product analysis was carried out using H-NMR spectroscopy.

Example 8a. Hydrosilylation of Allyl Glycidyl Ether (AGE) with Triethoxysilane Using IIbe An oven dried 25 mL 3-neck round bottom flask equipped with an addition funnel, reflux condenser and temperature probe was blanketed with nitrogen. To the flask was charged allylglycidyl ether (40 mmole), triethoxysilane (5% of 33 mmole with the remainder being charged to the addition funnel) and ligand IIbe (1.1 eq based on Pt). The flask was heated to 90° C., then charged with aniline (0.07 wt %) and Platinum(0)-1,3-divinyl-1,1,3,3-tetramethyldisiloxane complex solution in xylene (Pt-2%) (5 ppm). An exotherm was observed when the Pt catalyst was added. The triethoxysilane was added dropwise from the addition funnel to control the exotherm, maintaining the temperature below 100° C. After the addition the reaction mixture was held at 90° C. for 1.5 hours. The reaction was allowed to cool to rt. Analysis showed the desired product with 10% isomerization of AGE and no unreacted AGE.

Example 8b

The same reaction as above was carried out using a IIbe:Pt molar ratio of 2:1. Product analysis showed an 11% isomerization of AGE and no unreacted AGE.

Comparative Example 8

The above reaction was run at the same scale and under the same conditions, except without the use of ligand IIbe. Product analysis showed 10% AGE isomerization and 7% unreacted AGE.

Example 9. Hydrosilylation of Allyl Glycidyl Ether (AGE) with Triethoxysilane Using IIag An oven dried 25 mL 3-neck round bottom flask equipped with an addition funnel, reflux condenser and temperature probe was blanketed with nitrogen. To the flask was charged allyl glycidyl ether (40 mmole), triethoxysilane (5% of 33 mmole with the remainder being charged to the addition funnel) and ligand IIag (1.1 eq based on Pt). The flask was heated to 90° C., then charged with aniline (0.07 wt %) and Platinum(0)-1,3-divinyl-1,1,3,3-tetramethyldisiloxane complex solution in xylene (Pt-2%) (5 ppm). An exotherm was observed when the Pt catalyst was added. The triethoxysilane was added dropwise from the addition funnel to control the exotherm, maintaining the temperature below 100° C. After the addition the reaction mixture was held at 90° C. for 1.5 hours. The reaction was allowed to cool to rt. Product analysis showed slightly under 10% AGE isomerization and 2% unreacted AGE.

Comparative Example 9

This Comparative Example is the same as Comparative Example 8, meaning the reaction was run without using a ligand of this invention. The product showed 10% isomerized AGE and 7% unreacted AGE.

Example 10a. Hydrosilylation of 1-Octene with Methyldichlorosilane Using IIaf An oven dried 25 mL 3-neck round bottom flask equipped with an addition funnel, reflux condenser and temperature probe was blanketed with nitrogen. To the flask was charged 1-Octene (25.9 mmole), Platinum(0)-1,3-divinyl-1,1,3,3-tetramethyldisiloxane complex solution in xylene (Pt-2%) (10 ppm) and ligand IIaf (1.1 eq based on Pt). The flask was heated to 80° C. and the dichloromethylsilane (25.4 mmole) was added dropwise from the addition funnel to control the exotherm, maintaining the temperature below 85° C. After the addition the reaction mixture was held at 80° C. for 1.5 hour. The reaction was allowed to cool to rt. Analysis showed 5% 1-octene isomerization and about 1.3% unreacted 1-octene.

Example 10b. Hydrosilylation of 1-Octene with Methyldichlorosilane Using IIag

An oven dried 25 mL 3-neck round bottom flask equipped with an addition funnel, reflux condenser and temperature probe was blanketed with nitrogen. To the flask was charged 1-Octene (25.9 mmole), Platinum(0)-1,3-divinyl-1,1,3,3-tetramethyldisiloxane complex solution in xylene (Pt-2%) (10 ppm) and ligand IIag (1.1 eq based on Pt). The flask was heated to 80° C. and the dichloromethylsilane (25.4 mmole) was added dropwise from the addition funnel to control the exotherm, maintaining the temperature below 85° C. After the addition the reaction mixture was held at 80° C. for 1.5 hour. The reaction was allowed to cool to rt. Analysis showed 6.5% 1-octene isomerization and about 1.6% unreacted 1-octene.

Comparative Example 10

The above reaction was run at the same scale and under the same conditions, except without the use of ligand IIaf or IIag. Product analysis showed 7.4% isomerization and about 1.6% unreacted 1-octene.

Example 11a. Hydrosilylation of 1-Octene with Triethoxysilane Using IIbe

An oven dried 25 mL 3-neck round bottom flask equipped with an addition funnel, reflux condenser and temperature probe was blanketed with nitrogen. To the flask was charged 1-Octene (25.9 mmole), triethoxysilane (5% of 25.4 mmole with the remainder being charged to the addition funnel) and ligand IIbe (1.1 eq based on Pt). The flask was heated to 80° C., then charged with aniline (0.07 wt %) and Platinum(0)-1,3-divinyl-1,1,3,3-tetramethyldisiloxane complex solution in xylene (Pt-2%) (10 ppm). An exotherm is observed when the Pt catalyst is added. The triethoxysilane was added dropwise from the addition funnel to control the exotherm, maintaining the temperature below 90° C. After the addition the reaction mixture was held at 80° C. for 1 hour. The reaction was allowed to cool to rt. Product analysis showed about 7.3% 1-octene isomerization and no unreacted 1-octene.

Example 11b

The above reaction was run on the same scale and in an identical manner using 1.5:1 molar ratio of IIbe:Pt. Product analysis showed about 8% 1-octene isomerization and no unreacted 1-octene.

Comparative Example 11

The above reaction was run without the presence of ligand and showed 11% 1-octene isomerization and no unreacted 1-octene.

Example 12. Hydrosilylation of 1-Octene (8% Molar Excess) with Triethoxysilane Using IIag An oven dried 25 mL 3-neck round bottom flask equipped with an addition funnel, reflux condenser and temperature probe was blanketed with nitrogen. To the flask was charged 1-Octene (27.9 mmole), triethoxysilane (5% of 25.4 mmole with the remainder being charged to the addition funnel) and IIag (3 eq based on Pt). The flask was heated to 80° C., then charged with aniline (0.07 wt %) and Platinum(0)-1,3-divinyl-1,1,3,3-tetramethyldisiloxane complex solution in xylene (Pt-2%) (10 ppm). An exotherm was observed when the Pt catalyst was added. The triethoxysilane was added dropwise from the addition funnel to control the exotherm, maintaining the temperature below 90° C. After the addition the reaction mixture was held at 80° C. for 1 hour. The reaction was allowed to cool to rt. Product analysis showed 8% 1-octene isomerization and about 1% unreacted 1-octene.

Comparative Example 12

The above reaction was run on the same scale and under the same conditions except without the use of ligand IIag. Product analysis showed 11.5% 1-octene isomerization and 6.6% unreacted 1-octene.

Example 13. Hydrosilylation of 1,1,1,3,5,5,5-Heptamethyl-3-Vinyltrisiloxane with 1,1,3,3-Tetramethyldisiloxane Using IIbe This reaction was run in place of a standard elastomer forming reaction in order to use NMR spectroscopy as a tool to quickly test any effect of the internal dienic ligands II on completion of reaction.

An oven dried 50 mL 3-neck round bottom flask equipped with an addition funnel, reflux condenser and temperature probe was blanketed with nitrogen. To the flask was charged 1,1,1,3,5,5,5-heptamethyl-3-vinyltrisiloxane (40 mmole) and ligand IIbe (11 eq based on Pt). The flask was heated to 90° C., then charged with Platinum(0)-1,3-divinyl-1,1,3,3-tetramethyldisiloxane complex solution in xylene (Pt-2%) (5 ppm) and 1,1,3,3-tetramethyldisiloxane (21 mmol) was added dropwise from the addition funnel to control the exotherm, maintaining the temperature under 100° C. After the addition the reaction mixture was held at 90° C. for 1 hour. The reaction was allowed to cool to rt. Analysis showed complete reaction.

Comparative Example 13

The above reaction was performed at the same scale and under the same conditions. Product analysis showed about 2-4% unreacted vinylsiloxane ($MD^{Vi}M$).

Example 14a. Hydrosilylation of 1,1,1,3,5,5,5-Heptamethyl-3-Vinyltrisiloxane (from Supplier B) with 1,1,3,3-Tetramethyldisiloxane Using IIaf An oven dried 25 mL 3-neck round bottom flask equipped with an addition funnel, reflux condenser and temperature probe was blanketed with nitrogen. To the flask was charged 1,1,1,3,5,5,5-heptamethyl-3-vinyltrisiloxane (20 mmole) and ligand IIaf (4 eq based on Pt). The flask was heated to 90° C., then charged with Platinum(0)-1,3-divinyl-1,1,3,3-tetramethyldisiloxane complex solution in xylene (Pt-2%) (5 ppm) and 1,1,3,3-tetramethyldisiloxane (10.5 mmol) was added dropwise from the addition funnel to control the exotherm, maintaining the temperature under 98° C. After the addition the reaction mixture was held at 90° C. for 1 hour. The reaction was allowed to cool to rt. NMR analysis showed complete reaction.

Example 14b (Vinyl Siloxane from Supplier B)

The above reaction was repeated on the same scale and under identical conditions, except using ligand IIag (4 eq based on Pt) in place of ligand IIf. NMR analysis of the product showed essentially complete reaction, with about 1% vinylsiloxane remaining.

Comparative Example 14

The above reaction was carried out on the same scale and under identical conditions, but without the use of any added ligand II. NMR analysis showed essentially complete reaction.

Importantly, for the above "simulated cure" reaction, no adverse effect was observed with the use of ligands II, and those skilled in the art would be able to optimize use of these ligands for various applications. Almost all of the above hydrosilylation examples that were carried out using the ligands of this invention IIaf, IIag and IIbe in-situ showed distinct or discernible improvement over the comparative examples that did not contain the ligands. These improvements indicate the likelihood of Pt center stabilization by the ligands of this invention without negatively affecting reaction rate, thus leading to better reaction. This effect would be expected to carry over to the non-Pt metals of this invention. Additionally, there appears to be some binding differences between ligands IIaf, IIag, and IIbe with a rough decreasing binding strength order of IIag>IIaf>IIbe. Though this can be somewhat rationalized based on the presence of one or more Si substituent (and it's type) at the unsaturation, an aspect that was discussed earlier on the metal complex stabilization, binding ability may also change based on substrates and reaction conditions.

Further, it is then also anticipated that on the basis of the fundamental approach of this invention the same Pd (and other metal) center stabilization would be brought about in coupling reactions, especially using the in-situ (and more easily practiced) approach.

Certain non-limiting embodiments of the present disclosure are shown by the numbered Embodiments below. It should be appreciated that other embodiments within the spirit and scope of the present disclosure are contemplated. For example:

Embodiment 1. A compound according to Formula I:

$$M_aM'_bD_cD'_dT_eT'_fQ_g \quad \text{I}$$

wherein each occurrence of M, M', D, D', T, T', and Q may independently be present in any order or position in the compound, and wherein any occurrence of M must terminate a chain or side chain;

wherein:

M represents a monofunctional group of formula $R_3SiO_{1/2}$,

D represents a difunctional group of formula $R_2SiO_{2/2}$,

T represents a trifunctional group of formula $RSiO_{3/2}$,

Q represents a tetrafunctional group of formula $SiO_{4/2}$,

M', D', and T' each contain an independently selected internal alkenyl group such that there are at least two such groups per molecule that are preferably on adjacent siloxane units to provide an internal dienic structure capable of most preferably forming chelate complexes with Pt;

a≥0, b≥0, c≥0, d≥0, e≥0, f≥0, g≥0, but not all zero at once, and a, b, c, d, e, f and g are such that Formulae I can represent a trisiloxane, cyclic siloxane, linear siloxane oligomer, branched siloxane oligomer, linear siloxane polymer, cyclolinear siloxane polymer, branched siloxane polymer, siloxane cage, siloxane resin, or combinations thereof, but not a disiloxane meaning the sum c+d+e+f+g cannot equal zero;

each occurrence of R independently represent a monovalent hydrocarbyl group or, if contained within a cyclic structure, a divalent hydrocarbyl group at an internally unsaturated carbon;

wherein each occurrence of R which is not an internal alkenyl group is independently an alkyl or aryl group attached to Si in the M, M', D, D', and T, T' units of Formula I, and wherein each such alkyl or aryl groups independently contain 1-40 carbon atoms per group, preferably 1-20 carbon atoms per group;

wherein any and all such alkyl, alkenyl, and aryl groups may optionally and independently contain one or more heteroatoms selected from N, O, Si, S, or P, wherein any and all such alkyl, alkenyl, and aryl groups may be optionally and independently substituted with one or more halogens.

Embodiment 2. A compound according to Embodiment 1, selected individually or as any mixture, wherein all hydrocarbyl groups on Si, which are not the internal alkenyl groups, are methyl.

Embodiment 3. A compound according to Embodiment 2, selected individually or as any mixture, wherein the internal alkenyl groups directly attached to Si are, at each occurrence, independently selected from $Me_3SiCH{=}CH{-}$, n-oct-1-enyl, n-hex-1-enyl, cyclooct-enyl and $C_6H_5{-}CH{=}CH{-}$.

Embodiment 4. A compound according to Embodiment 1, selected individually or in any mixture, having a structure selected from Formulae IV-VII:

$$[\{OSi(R^1CR^2{=}CR^3)R\}_j\{OSiR_2\}_k] \quad \text{IV}$$

$$R^1CR^2{=}CR^3SiR^{13}R^{14}[OSi(R^1CR^2{=}CR^3)R]_x[OSiR_2]_yOSiR^{13}R^{14}CR^4{=}CR^5R^6 \quad \text{V}$$

$$Me_3Si[OSi(R^1CR^2{=}CR^3)R]_x[OSiR_2]_yOSiMe_3 \quad \text{VI}$$

$$[\{OSi(R^1CR^2{=}CR^3)\}_l\{OSiR_2\}_m\{OSiR_3\}_n]_p \quad \text{VII}$$

wherein:

$R^1$ and $R^6$ are independently an alkyl or aryl group, or are independently H, alkyl, or aryl if $CR^2{=}CR^3$ or $CR^4{=}CR^5$ is part of a cyclic structure such as a cyclic olefin;

$R^2$, $R^3$, $R^4$, and $R^5$ are independently H, an alkyl group, or an aryl group;

$R^{13}$ and $R^{14}$ are independently alkyl or aryl, $R^2$ and $R^3$ and/or $R^4$ and $R^5$ taken together may optionally form part of a cyclic structure;

each occurrence of R in the T units is independently alkyl or aryl;

each occurrence of R in D and M units is independently alkyl or aryl;

each such alkyl or aryl independently preferably contains 1-20 carbon atoms;

wherein the compound comprises at least two adjacent siloxane units containing internal alkenyl groups;

said alkyl or aryl groups may optionally and independently contain one or more heteroatoms selected from N, O, P, Si, or S; and said alkyl or aryl groups may be optionally and independently substituted with one or more halogens.

Embodiment 5. A compound according to Embodiment 4, selected individually or in any mixture, wherein each alkyl group is methyl ($CH_3$) and each aryl group is phenyl ($C_6H_5$).

Embodiment 6. A compound according to Embodiment 1, selected individually or in any mixture, selected from the following Formulae:

IVa-1

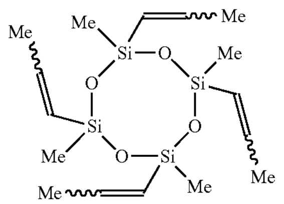

IVa-2

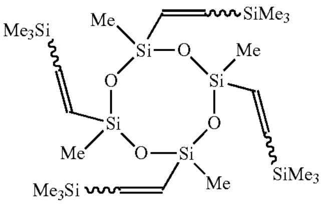

IVa-3

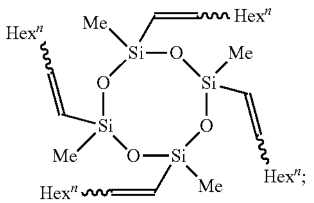

and

-continued

IVb

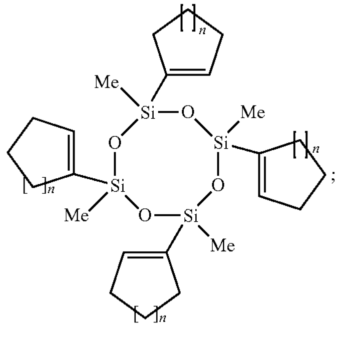

wherein Hex$^n$ is a n-hexyl group, and wherein n=1-4.

Embodiment 7. A chemical composition comprising one or more compounds according to any of Embodiments 1-6.

Embodiment 8. The chemical composition of Embodiment 7, further comprising one or more compounds containing at least two internal alkenyl groups on adjacent siloxane units defined by one or more of M'M', M'D', M'T', D'D', D'T', T'T'.

Embodiment 9. A compound according to Formula IIb or III, selected individually or in any mixture within each type hydrocarbon or ether:

IIb $$R^1CR^2{=}CR^3CR^{15}R^{16}OCR^{15}R^{16}CR^4{=}CR^5R^6$$

III

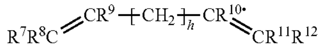

wherein:

$R^1$ and $R^6$ are independently an alkyl or aryl group, or H if $CR^2{=}CR^3$ or $CR^4{=}CR^5$ is part of a cyclic structure such as a cyclic olefin;

$R^2$, $R^3$, $R^4$, and $R^5$ are independently H, an alkyl group, or an aryl group;

$R^7$ and $R^{12}$ are independently an alkyl or aryl group, or H if $CR^8{=}CR^9$ or $CR^{10}{=}CR^{11}$ is part of a cyclic structure such as a cyclic olefin;

$R^8$, $R^9$, $R^{10}$, and $R^{11}$ are independently H, an alkyl group, or an aryl group $R^2$ and $R^3$ and/or $R^4$ and $R^5$ taken together may form part of a cyclic structure in Formula IIb, or $R^7/R^8$ and $R^9$ and/or $R^{10}$ and $R^{11}/R^{12}$ taken together may form part of a cyclic structure in Formula III;

$R^9$ and $R^{10}$ are independently H, alkyl or aryl.

$R^{15}$ and $R^{16}$ are independently H, alkyl or aryl each said alkyl or aryl group is 1-20 carbon atoms;

h=0-3;

said alkyl or aryl groups may optionally and independently contain one or more heteroatoms such as N, O, P, Si, and S; and said alkyl or aryl groups may optionally and independently be substituted with one or more halogens.

Embodiment 10. A compound according to Embodiment 9, selected individually or in any mixture, selected from the following formulae:

IIba

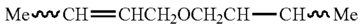

-continued

IIbb

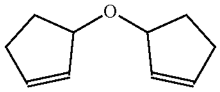

IIbc

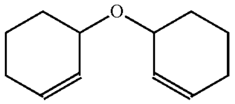

IIbd

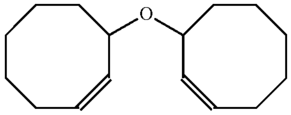

IIbe $Et_3Si$~$CH{=}CHCH_2OCH_2CH{=}CH$~$SiEt_3$

IIIa

Me~$CH{=}CH{-}CH{=}CH$~Me

IIIb

Me~$CH{=}CH{-}CH_2{-}CH{=}CH$~Me

IIIc

Me~$CH{=}CH{-}CH_2CH_2{-}CH{=}CH$~Me

IIIaa

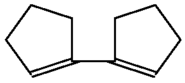

IIIbb

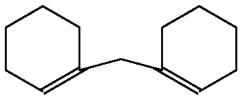

IIIcc

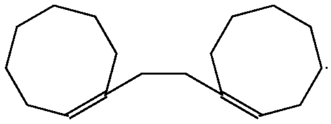

Embodiment 11. A chemical composition comprising one or more compounds according to any of Embodiments 9-10.

Embodiment 12. A chemical composition according to Embodiment 11, further comprising one or more compounds according to one or more of Embodiments 1-8.

Embodiment 13. A heterogeneous, internal diene functionalized catalyst support comprising:

a catalyst support comprising one or more of oxides of silicon, oxides of aluminum, oxides of titanium or oxides of cerium, their physical mixtures, and their compositional mixtures and variants;

one or more siloxane compounds or portions thereof containing an internal alkenyl group on adjacent siloxane units, the one or more siloxane compounds or portions thereof being chemically bound to the catalyst support.

Embodiment 14. The heterogeneous, internal diene functionalized catalyst support of Embodiment 13, wherein the internal alkenyl groups are covalently attached to the catalyst support by M', D', or T' siloxane units, preferably M' or T' as the linkage.

Embodiment 15. The heterogeneous, internal diene functionalized catalyst support of Embodiment 14 preferably being functionalized at least at some neighboring Si/Al/Ti/Ce support metal atoms at the surface.

Embodiment 16. The heterogeneous, internal diene functionalized catalyst support of Embodiment 15, wherein T' or M' units containing the respective internal alkenyl groups are at the surface for silicon oxide containing supports, with T' preferred, while M' units containing the internal alkenyl groups are at the surface for the other non-silicon oxide based supports via chemical-mechanical treatment of these supports to attach the M' units.

Embodiment 17. The heterogeneous, internal diene functionalized catalyst support of Embodiment 13 wherein the internal alkenyl groups directly attached to Si are independently selected from $Me_3SiCH{=}CH{-}$, n-oct, -1-enyl, n-hex-1-enyl, cyclooct-enyl and $C_6H_5{-}CH{=}CH{-}$.

Embodiment 18. The heterogeneous, internal diene functionalized catalyst support of Embodiment 13, wherein the one or more compounds containing an internal alkenyl group on adjacent siloxane units are each selected from the M' portions of the following M'M' compounds:

IIab

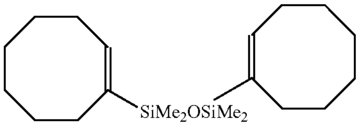

IIad $CH_3CH_2$~$CH{=}CHSiMe_2OSiMe_2CH{=}CH$~$CH_2CH_3$

IIae $EtCH_2CH_2$~$CH{=}CHSiMe_2OSiMe_2CH{=}CH$~$CH_2CH_2Et$

IIaf $Et(CH_2)_3CH_2$~$CH{=}CHSiMe_2OSiMe_2CH{=}CH$~$CH_2(CH_2)_3Et$

IIag $Me_3Si$~$CH{=}CHSiMe_2OSiMe_2CH{=}CH$~$SiMe_3$

IIah $C_6H_5$~$CH{=}CHSiMe_2OSiMe_2CH{=}CH$~$C_6H_5$.

Embodiment 19. The heterogeneous, internal diene functionalized catalyst support of any of Embodiments 13 to 18 further comprising Pt, Ru, Os, Co, Rh, Ir, Ni, or Pd complexes attached to the support via the internal alkenyl groups preferably at least via one set of such internal alkenyl groups on adjacent siloxane units of the one or more compounds.

Embodiment 20. A complex according to Formula VIII, selected individually or in any mixture:

VIII $$[R^1 \sim CR^2{=}CR^3{-}E{-}X{-}E{-}CR^4{=}CR^5 \sim R^6]_m[Pt]_n[L]_p$$

wherein:

$R^1$ and $R^6$ are independently an alkyl or aryl group, or H if $CR^2{=}CR^3$ or $CR^4{=}CR^5$ is part of a cyclic structure such as a cyclic olefin;

$R^2$, $R^3$, $R^4$, and $R^5$ are independently H, an alkyl group, or an aryl group;

$R^2$ and $R^3$ and/or $R^4$ and $R^5$ taken together may form part of a cyclic structure;

both occurrences of E are either $SiR^{13}R^{14}$ where $R^{13}$ and $R^{14}$ are independently alkyl or aryl, or $CR^{15}R^{16}$ where $R^{15}$ and $R^{16}$ are independently H, alkyl or aryl;

X is selected from oxygen (O) and nitrogen (N), preferably oxygen, or X is a divalent hydrocarbyl group, preferably $CH_2$;

L is a monodentate or bidentate neutral ligand selected from organophosphines, preferably triorganophosphines, and optionally triarylphosphine, or CO, and p=0-1;

wherein, if p=1, the ratio m:n is 1:1;

wherein, if p=0, the ratio m:n is from 2:1 to 3:2, with 3:2 being preferred for Pt;

wherein each said alkyl or aryl group either within the internal alkenyl group or on the organophosphine independently contains 1-20 carbon atoms, optionally, Aryl groups are preferred on the phosphine ligand;

wherein said alkyl or aryl group may optionally and independently contain heteroatoms selected from N, O, P, Si, S; and wherein each said alkyl or aryl group may optionally and independently be substituted with halogen.

Embodiment 21. A chemical composition comprising one or more complexes according to Embodiment 20, additionally comprising excess internal diene ligand compounds according to Formula VIII and/or Embodiment 1.

Embodiment 22. A complex according to Formula VIIIA, selected individually or in any mixture:

VIIIA $$[R^1\sim CR^2{=}CR^3{-}E{-}X{-}E{-}CR^4{=}CR^5\sim R^6]_m[Pt]_n[L']_p$$

wherein:

$M_t$ is selected from Ru, Os, Co, Rh, Ir, Ni, or Pd;

$R^1$ and $R^6$ are independently an alkyl or aryl group or H if $CR^2{=}CR^3$ or $CR^4{=}CR^5$ is part of a cyclic structure such as a cyclic olefin;

$R^2$, $R^3$, $R^4$, and $R^5$ are independently H, an alkyl group, or an aryl group;

$R^2$ and $R^3$ and/or $R^4$ and $R^5$ taken together may form part of a cyclic structure;

Both E are either $SiR^{13}R^{14}$ where $R^{13}$ and $R^{14}$ are independently alkyl or aryl, or $CR^{15}R^{16}$ where $R^{15}$ and $R^{16}$ are independently H, alkyl or aryl;

X is selected from oxygen (O) and nitrogen (N), preferably oxygen or divalent hydrocarbyl group, preferably $CH_2$;

wherein the ratio of m:n is from 1:1 to 2:1, wherein at least one internal dienic ligand of Formula VIIIA is coordinated to at least one $M_t$, wherein any additional ligand(s) L' are present to produce a coordinatively viable complex with p from 0-4;

wherein the complex are monomeric or dimeric and n is 1 or 2;

wherein each said alkyl or aryl group contains 1-20 carbon atoms;

wherein said alkyl or aryl groups may optionally and independently contain heteroatoms selected from N, O, P, Si, S;

wherein each said alkyl or aryl group may optionally and independently be substituted with halogen.

Embodiment 23. A complex according to Embodiment 22, wherein each occurrence of L', independently, is selected from monodentate, bidentate, multidentate, or multihapto ligands, the ligands selected from triorganophosphines, organophosphine oxides, organosulfides, sulfoxides, olefins or dienes, naphthoquinones, eta-6-arenes, halides, or alkyl or aryl.

Embodiment 24. A chemical composition comprising one or more complexes according to Embodiment 22, additionally comprising excess internal diene ligand compounds according to Formula VIIIA and/or Embodiment 1.

Embodiment 25. A complex according to Formula VIIIA-1, selected individually or in any mixture:

VIIIA-1

$$[R^1\sim CR^2{=}CR^3{-}E{-}X{-}E{-}CR^4{=}CR^5\sim R^6]_m[Pd]_n[L']_p$$

wherein, $R^1$ and $R^6$ are independently an alkyl or aryl group or H if $CR^2{=}CR^3$ or $CR^4{=}CR^5$ is part of a cyclic structure such as a cyclic olefin;

$R^2$, $R^3$, $R^4$, and $R^5$ are independently H, an alkyl group, or an aryl group;

$R^2$ and $R^3$ and/or $R^4$ and $R^5$ taken together may form part of a cyclic structure;

Both E are either $SiR^{13}R^{14}$ where $R^{13}$ and $R^{14}$ are independently alkyl or aryl, or $CR^{15}R^{16}$ where $R^{15}$ and $R^{16}$ are independently H, alkyl or aryl;

X is selected from oxygen (O) and nitrogen (N), preferably oxygen, or divalent hydrocarbyl group, preferably $CH_2$;

L' is independently selected from: monodentate ligands selected from triorganophosphines, triorganophosphine oxides, organosulfides, and sulfoxides, or substituted or unsubstituted olefins selected from cyclohexene, maleates, and fumarates, or naphthoquinones, wherein L' may contain one or more alkyl or aryl groups;

the ratio m:n ranges from 1:1 to 2:1, preferably 3:2 for Pd, and p is from 0-1;

wherein said alkyl or aryl groups on the dienic ligands or on the ligands L' independently contain 1-20 carbon atoms;

wherein said alkyl or aryl groups may optionally and independently contain heteroatoms selected from N, O, P, Si, or S;

wherein each said alkyl or aryl group may optionally and independently be substituted with halogen; and wherein L' may optionally contain heteroatoms selected from N, O, P, or S.

Embodiment 26. A chemical composition comprising one or more complexes according to Embodiment 25, additionally comprising excess internal diene ligand compounds according to Formula VIIIA-1 and/or Embodiment 1.

Embodiment 27. A complex according to Formulae VIIIA-1a and VIIIA-1b, selected individually or in any mixture:

VIIIA-1a

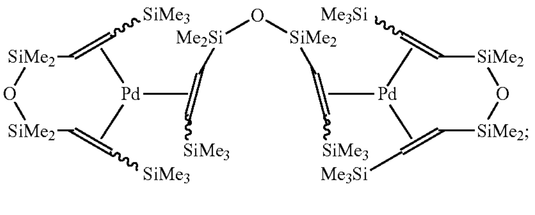

-continued

VIIIA-1b

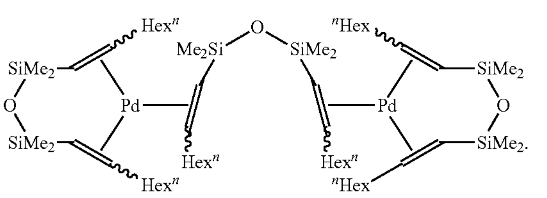

Embodiment 28. A complex according to Formulae VIIIab-VIIIah, selected individually or in any mixture:

VIIIab

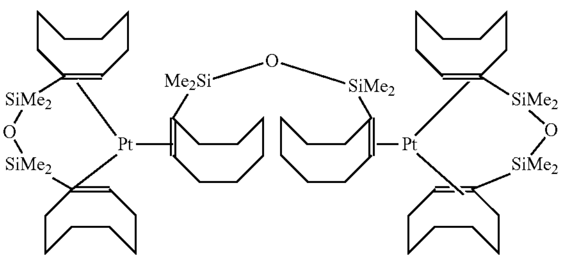

VIIIac

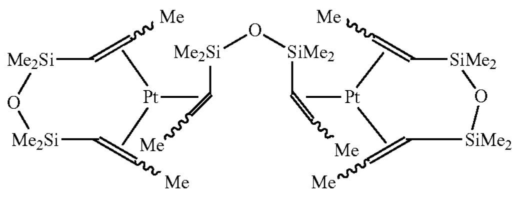

VIIIad

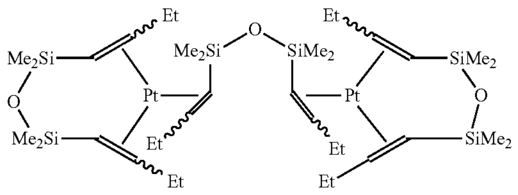

VIIIaf

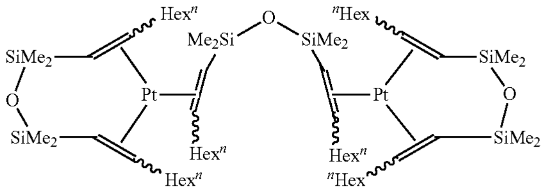

VIIIag

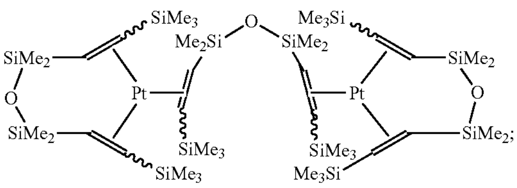

and

-continued

VIIIah

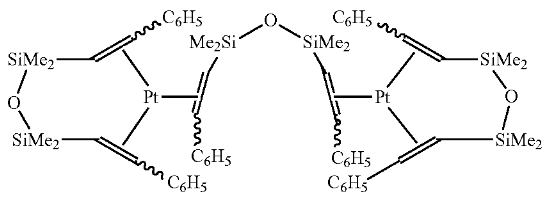

wherein, Et is ethyl and Hex$^n$ is n-hexyl, $C_6H_5$ is phenyl.

Embodiment 29. A complex according to Formulae VIIIB-1 or VIIIB-2, selected individually or in any mixture:

VIIIB-1

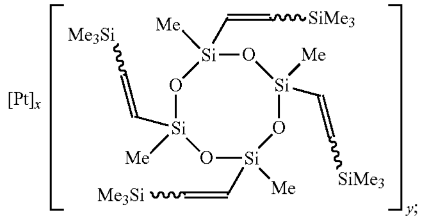

and

VIIIB-2

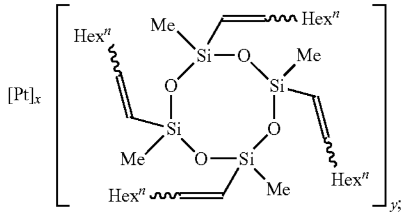

wherein Hex$^n$ is n-hexyl;

wherein y:x provides C═C:Pt ratio preferably at least 3:1.

Embodiment 30. A chemical composition comprising one or more complexes according to Embodiment 29, and excess cyclosiloxane ligand according to Formulae VIIIB-1 or VIIIB-2 for greater complex stability.

Embodiment 31. A complex according to Embodiment 20, selected from Formulae VIIIb, VIIIba or VIIIbe, selected individually or in any mixture:

VIIIb

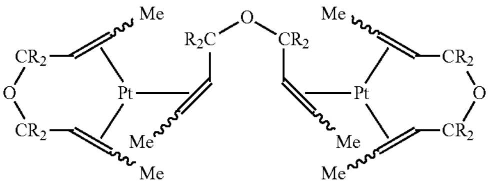

VIIIba

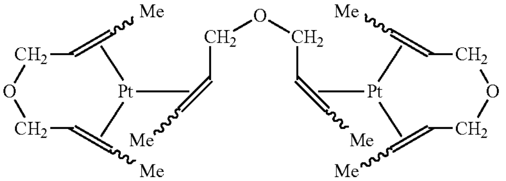

-continued

VIIIbe

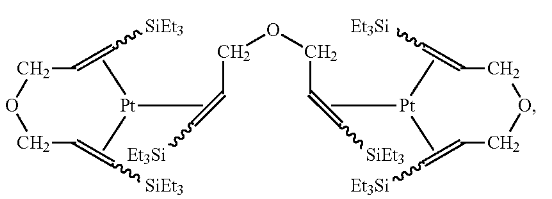

wherein, each R independently is a monovalent hydrocarbyl group or H; and wherein Me is methyl and Et is ethyl.

Embodiment 32. A complex according to Formulae IX-XII, selected individually or in any mixture:

IX

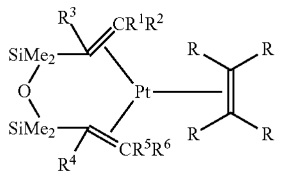

X

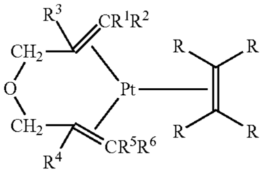

IXa

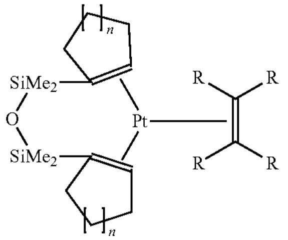

Xa

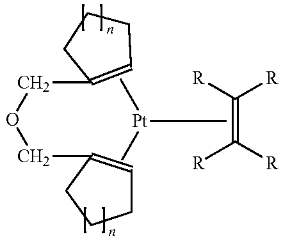

IXb

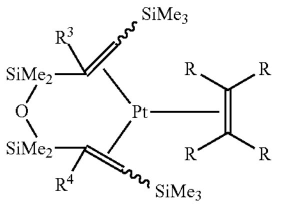

-continued

Xb

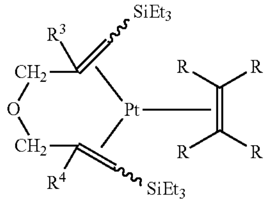

IXc

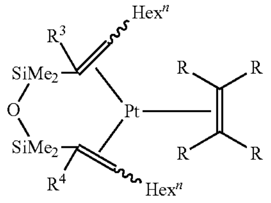

XI

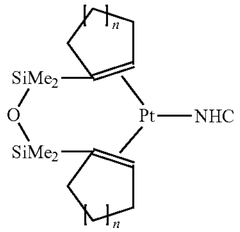

XII

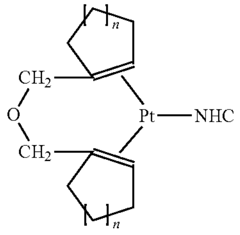

wherein, $R^1$ and $R^6$ are independently an alkyl or aryl group, or are independently H, alkyl, or aryl if $CR^2{=}CR^3$ or $CR^4{=}CR^5$ is part of a cyclic structure such as a cyclic olefin;

$R^2$, $R^3$, $R^4$, and $R^5$ are independently H, an alkyl group, or an aryl group;

$R^2$ and $R^3$ and/or $R^4$ and $R^5$ taken together may optionally form part of a cyclic structure;

R in IX-IXa-c and X-Xa-c are alkyl or aryl and when taken together on adjacent carbon atoms could form a cyclic structure;

said alkyl or aryl groups may optionally contain heteroatoms selected from N, O, P, Si, and S;

wherein said alkyl or aryl groups may be optionally and independently substituted with one or more halogens;

optionally, wherein Monoolefin $R_2C{=}CR_2$ is selected from maleic anhydride, dimethyl maleate, diallyl maleate, dimethyl fumarate, 2-methyl-1,4-naphthoquinone, fumaronitrile. NHC═N-heterocyclic carbene. One such preferred NHC is 1,3-bis(2,6-diisopropylphenyl)imidazole-2-ylidene;

optionally, wherein Pt is replaced with Ni or Pd, and optionally, if Pd, the monoolefin is selected from the above or a triorganophosphine.

Embodiment 33. A Pt complex of Formula XIII:

$$[M_aM'_bD_cD'_dT_eT'_fQ_g]_m[Pt]_n[L]_p \quad \text{XIII}$$

wherein each occurrence of M, M', D, D', T, T', and Q may independently be present in any order or position in the compound, and wherein any occurrence of M must terminate a chain or side chain;

wherein:

M represents a monofunctional group of formula $R_3SiO_{1/2}$,

D represents a difunctional group of formula $R_2SiO_{2/2}$,

T represents a trifunctional group of formula $RSiO_{3/2}$,

Q represents a tetrafunctional group of formula $SiO_{4/2}$,

M', D', and T' each contain an independently selected internal alkenyl group such that there are at least two such groups per molecule that are preferably on adjacent siloxane units to provide an internal dienic structure capable of preferably forming chelate complexes with Pt;

a≥0, b≥0, c≥0, d≥0, e≥0, f≥0, g≥0, but not all zero at once, and a, b, c, d, e, f and g are such that a Formula I ligand in metal complex XIII can represent a disiloxane, trisiloxane, cyclic siloxane, linear siloxane oligomer, branched siloxane oligomer, linear siloxane polymer, cyclolinear siloxane polymer, branched siloxane polymer, siloxane cage, siloxane resin, or combinations thereof;

each occurrence of R independently represents a monovalent hydrocarbyl group or, if contained within a cyclic structure, a divalent hydrocarbyl group at an internally unsaturated carbon;

wherein each occurrence of R which is not an internal alkenyl group is independently an alkyl or aryl group attached to Si in the M, M', D, D', and T, T' units of Formula I, and wherein each such alkyl or aryl groups independently contain 1-40 carbon atoms per group, preferably 1-20 carbon atoms per group;

wherein any and all such alkyl, alkenyl, and aryl groups may optionally and independently contain one or more heteroatoms selected from N, O, Si, S, or P, wherein any and all such alkyl, alkenyl, and aryl groups may be optionally and independently substituted with one or more halogens;

wherein values of m and n are such that at least 3 aliphatic, internal olefinic C═C group per Pt are available on the SiO-based ligand (with two internal C═C being on adjacent silicon atoms), with a preferred level of 4-3 internal aliphatic C═C groups per Pt, most preferred being 3 such groups per Pt;

wherein L is a monodentate ligand selected from a triorganophosphine like triphenylphosphine, CO, internal monoolefin selected from 2 butene, dimethyl maleate/fumarate, fumaronitrile, 2-methyl-1,4-naphthoquinone, triorganophosphine oxide; and wherein p is from 0 to 1;

optionally wherein Pt is replaced, independently at each occurrence, with Ni or Pd.

Embodiment 34. The complex according to Embodiment 33 wherein Pt in the Formula by weight can vary between 0.2 and about 38 percent Embodiment 35. A chemical composition comprising one or more complexes of 33, and one or more additional ligand compounds according to said formula XIII.

Embodiment 36. A complex according to Formula XIIIA, selected individually, or in any mixture:

$$[M_aM'_bD_cD'_dT_eT'_fQ_g]_m[M_t]_n[L]_p \quad \text{XIIIA}$$

wherein each occurrence of M, M', D, D', T, T', and Q may independently be present in any order or position in the compound, and wherein any occurrence of M must terminate a chain or side chain;

wherein:

M represents a monofunctional group of formula $R_3SiO_{1/2}$,

D represents a difunctional group of formula $R_2SiO_{2/2}$,

T represents a trifunctional group of formula $RSiO_{3/2}$,

Q represents a tetrafunctional group of formula $SiO_{4/2}$,

M', D', and T' each contain an independently selected internal alkenyl group such that there are at least two such groups per molecule that are preferably on adjacent siloxane units to provide an internal dienic structure capable of preferably forming chelate complexes with $M_t$;

a≥0, b≥0, c≥0, d≥0, e≥0, f≥0, g≥0, but not all zero at once, and a, b, c, d, e, f and g are such that Formulae I can represent a trisiloxane, cyclic siloxane, linear siloxane oligomer, branched siloxane oligomer, linear siloxane polymer, cyclolinear siloxane polymer, branched siloxane polymer, siloxane cage, siloxane resin, or combinations thereof;

each occurrence of R independently represent a monovalent hydrocarbyl group or, if contained within a cyclic structure, a divalent hydrocarbyl group at an internally unsaturated carbon;

wherein each occurrence of R which is not an internal alkenyl group is independently an alkyl or aryl group attached to Si in the M, M', D, D', and T, T' units of Formula I, and wherein each such alkyl or aryl groups independently contain 1-40 carbon atoms per group, preferably 1-20 carbon atoms per group;

wherein any and all such alkyl, alkenyl, and aryl groups may optionally and independently contain one or more heteroatoms selected from N, O, Si, S, or P, wherein any and all such alkyl, alkenyl, and aryl groups may be optionally and independently substituted with one or more halogens;

wherein values of m and n are such that at least 2 aliphatic, internal olefinic C═C group per $M_t$ are available on the SiO-based ligand (with two internal C═C being on adjacent silicon atoms), with a preferred level of 4-3 internal aliphatic C═C groups per $M_t$, most preferred being 2-3 such groups per $M_t$;

wherein L is a monodentate/bidentate/multidentate ligand such as a triorganophosphine like triphenylphosphine, triorganophosphine oxide, bis(triorganophosphine), CO, internal monoolefin such as 2 butene, dimethyl maleate/fumarate, fumaronitrile, cyclodienes such as 1,5-COD;

wherein p is from 0-4.

Embodiment 37. The complex according to Embodiment 36 wherein $M_t$ loading is from about 2% to about 40% w/w of the complex.

Embodiment 38. The complex according to Embodiment 36 wherein a vanishing value of the sum of a, b, c, d, e, f and g is b=2.

Embodiment 39. A chemical composition comprising one or more complexes of 36, and one or more ligand compounds in excess of formula XIIIA and/or according to Embodiment 1.

Embodiment 40. A Pt complex according to Formulae XIV-XVII, selected individually or in any mixture:

XIV

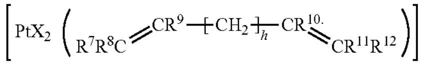

XV

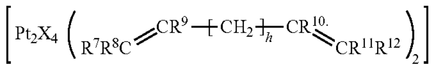

XVI

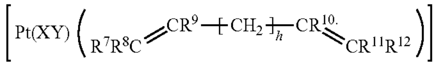

XVII

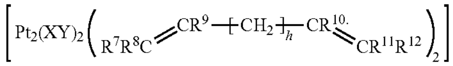

wherein, X alone represents a halide ion, preferably $Cl^-$ or independently an alkyl, aryl, alkenyl or alkynyl group, preferably selected from methyl, benzyl, phenyl, vinyl, acetylide, wherein XY represents a dianionic ligand such as one based on catechol;

wherein the radicals in each pair $R^7/R^8$ and $R^{11}/R^{12}$ could both be independently alkyl, aryl or silyl, but only one in either pair could be H, meaning both unsaturations in the diene are internal;

wherein either $R^7$ or $R^8$ taken together with $R^9$ could be part of a cyclic structure, as could either $R^{11}$ or $R^{12}$ taken together with $R^{10}$:

wherein h=0-3;

wherein $R^7$, $R^8$, $R^9$, $R^{10}$, $R^{11}$, an $R^{12}$ are optionally an independently selected from C1-C20 alkyl, C6-C14 aryl and C3-C18 alkenyl groups, optionally containing heteroatoms such as nitrogen, oxygen, phosphorus, sulfur, and optionally substituted with halogen, an optionally, $R^7$, $R^8$, $R^9$, $R^{10}$, $R^{11}$, an $R^{12}$ are independently selected from C1-C8 alkyl substituents, phenyl for aryl substituents and alkenyl chain length of 3-8, or C5-C8 cyclic olefin length.

Embodiment 41. A Pt complex according to Embodiment 40 selected individually or in any mixture, wherein the dienes III represent IIIa-c, IIIaa, IIIbb, and IIIcc. X represents a halide ion (with chloride preferred) or independently an alkyl, aralkyl, aryl, alkenyl or alkynyl group (examples being methyl, phenyl, vinyl, acetylide), XY represents a dianionic ligand such as one based on catechol:

IIIa

Me∿CH=CH—CH=CH∿Me

IIIb

Me∿CH=CH—$CH_2$—CH=CH∿Me

IIIc

Me∿CH=CH—$CH_2CH_2$—CH=CH∿Me

IIIaa

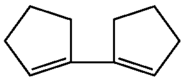

-continued

IIIbb

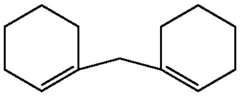

IIIcc

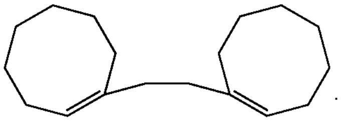

.

Embodiment 42. Metal complexes or Formula XVIII, selected individually or in any mixture within complexes of the same metal:

XVIII $$(M_t)_a(ID)_b(L^1)_c(LL)_dX_e$$

where $M_t$=Ru, Os, Co, Rh, Ir, Ni or Pd; ID=an internal diene of this invention II-VII, with preferred internal dienes IIf-h, IIIa-c, IIIaa, IIIcc, IIbe, IVa-2 or IVa-3; $L^1$=neutral, anionic or cationic alkyl/aryl, boron-, nitrogen-, oxygen-, phosphorus-, sulfur-based or halide ligand selected preferably from methyl, ethyl, phenyl, cyclopentadienyl, chloride, bromide, alkoxide, carboxylate, CO, ammonia, amines, N-heterocyclic carbenes, eta-6-benzene, organophosphines, organophosphine oxides, organosulfides, olefins such as dimethyl maleate/fumarate, fumaronitrile, C2-C8 olefins, $NO^+$, or a hydride/deuteride ligand; LL=a neutral, cationic, anionic, multidentate/mutihapto ligand based on the same types as for $L^1$, selected preferably from bis(alkyl or aryl), cyclopentadienyl, eta-6-arene, diamines, triamines, aminocarboxylates, dicarboxylates, eta-6-arenes, cyclodienes such as 1,5-COD or norbornadiene, bis(triorganophosphines), di(organosulfides); X=a counterion when the complex moiety has a charge, selected preferably from chloride, bromide, carboxylates, tetrafluoroborate, hexafluorophosphate, $Li^+$, $Na^+$, or $K^+$, but could be part of the complex moiety itself as noted above, especially when X is a coordinating anion such as halide or carboxylate; a=1-2, b=1-2 per $M_t$ atom, c=0-4, d=0-2 and e=0-4.

Embodiment 43. The complex according to Embodiment 42 where the internal diene is selected from:

IIaf $Et(CH_2)_3CH_2$∿CH=$CHSiMe_2OSiMe_2CH$=CH∿$CH_2(CH_2)_3Et$

IIag $Me_3Si$∿CH=$CHSiMe_2OSiMe_2CH$=CH∿$SiMe_3$

IIah $C_6H_5$∿CH=$CHSiMe_2OSiMe_2CH$=CH∿$C_6H_5$.

IIIa

Me∿CH=CH—CH=CH∿Me

IIIb

Me∿CH=CH—$CH_2$—CH=CH∿Me

IIIc

Me∿CH=CH—$CH_2CH_2$—CH=CH∿Me

IIIaa

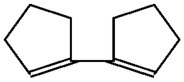

-continued

IIIcc

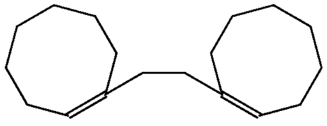

IIbe $Et_3Si\sim CH{=}CHCH_2OCH_2CH{=}CH\sim SiEt_3$

IVa-2

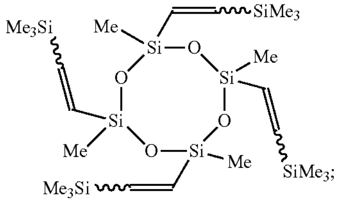

and

IVa-3

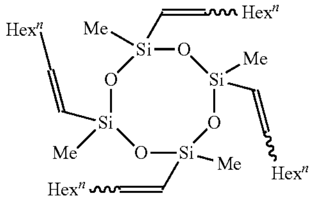

Embodiment 44. Supported Pt catalysts, wherein, the supports are internal alkene functionalized silica, alumina, titania or ceria or any mixtures thereof, the preferred internal alkenyl groups attached to T' or M' silicon atoms at the surface are $Me_3SiCH{=}CH—$, n-oct-1-enyl, n-hex-1-enyl, cyclooct-enyl or $C_6H_5—CH{=}CH—$ and where the Pt is chemically bound to the supports via bonds to the attached internal alkenyl substitutents, the range of Pt loading being between 0.5 and 30 percent w/w with the preferred range of 1-10% w/w.

Embodiment 45. Supported Pt catalysts, wherein, the supports are internal alkene functionalized silica, alumina, titania or ceria or any mixtures thereof, the preferred internal alkenyl groups attached to T' (or M') silicon atoms at the surface are $Me_3SiCH{=}CH—$, n-oct-1-enyl, n-hex-1-enyl, cyclooct-enyl or $C_6H_5—CH{=}CH—$ and where the Pt is chemically bound to the supports via bonds to the attached internal alkene substituents, the range of Pt loading being between 0.5 and 30 percent w/w with the preferred range of 1-10% w/w; optionally wherein, the metal in place of Pt is Ru, Os, Co, Rh, Ir, Ni or Pd; ancillary ligands such as triorganophosphines, CO, 1,5-COD, olefins and any others defined in any preceding Embodiment may be bound to the metal for stability or to satisfy coordination/valency requirements; preferred metal loading is 5% w/w to about 1 ppm.

Embodiment 46. A process for hydrosilylation of unsaturated compounds containing one or more double and/or triple bonds comprising reacting (a) a silyl or siloxy hydride with (b) an unsaturated compound in the presence of (c) one or more platinum ((0) or platinum (II) complex containing internal dienic ligand of any of the preceding Embodiments, and (d) optionally a cure inhibitor, (e) at a temperatures of −50° C. to 250° C. and (f) neat or in the presence of a solvent chosen from a hydrocarbon, a halogenated hydrocarbon, an ether, an alcohol or a combination of two or more thereof.

Embodiment 47. The process of Embodiment 46, wherein the substrate unsaturated compound refers to carbon-carbon double or triple bonds.

Embodiment 48. A process for hydrosilylation of unsaturated compounds containing one or more double and/or triple bonds comprising reacting (a) a silyl or siloxy hydride with (b) an unsaturated compound in the presence of (c) a platinum (0, II, or IV) compound or complex and one or more internal dienic ligand of any of the preceding Embodiments as additive, (d) optionally a cure inhibitor, (e) at a temperatures of −50° C. to 250° C., and (f) neat or in the presence of a solvent chosen from a hydrocarbon, a halogenated hydrocarbon, an ether, an alcohol or a combination of two or more thereof.

Embodiment 49. The process of Embodiment 48, wherein the substrate unsaturated compound refers to carbon-carbon double or triple bonds.

Embodiment 50. Catalyzed processes such as C—C, C—N and C—O coupling reactions comprising reacting (a) an aromatic halide/vinyl halide/an aromatic triflate with (b) a primary or secondary amine/amide, an alcohol, an aryl boronic acid, aryl boronate, vinyl halide or an activated olefin in the presence of (c) a Group IX or X or Pt Group metal complex containing one or more internal dienic ligands of any of the preceding Embodiments or (d) a suitable compound/complex of these metals preferably $K_2PdCl_4$, (COD) $PdCl_2$, $RuCl_3$, $Ru(acac)_3$, $(Ph_3P)_4RuCl_2$, $RhCl_3$, $IrCl_3$, $[Ir(COD)Cl]_2$, or an organophosphine complex of these metals, in the presence of one or more internal dienic ligand additive of any of the preceding Embodiments reactions are run wither neat or in solvents selected from hydrocarbons, halohydrocarbons, ethers or combinations thereof; the preferred internal alkenyl groups on Si for the dienic ligands associated with the complexes of these metals or for in situ reactions with common compounds of these metals are selected from $Me_3SiCH{=}CH—$, n-oct-1-enyl, n-hex-1-enyl, cyclooct-enyl or $C_6H_5—CH{=}CH—$; preferred hydrocarbon- or ether-based dienes are IIIc and IIbe:

IIIc $Me\sim CH{=}CH—CH_2CH_2—CH{=}CH\sim Me$

IIbe $Et_3Si\sim CH{=}CHCH_2OCH_2CH{=}CH—SiEt_3$.

INCORPORATION BY REFERENCE

The entire disclosure of each of the patent documents, including certificates of correction, patent application documents, scientific articles, governmental reports, websites, and other references referred to herein is incorporated by reference herein in its entirety for all purposes. In case of a conflict in terminology, the present specification controls.

EQUIVALENTS

The invention can be embodied in other specific forms without departing from the spirit or essential characteristics thereof. The foregoing embodiments are to be considered in all respects illustrative rather than limiting on the invention described herein. In the various embodiments of the compositions and methods of the present invention, where the term comprises is used with respect to the compositions or recited steps of the methods, it is also contemplated that the compositions and methods consist essentially of, or consist of, the recited compositions or steps or components. Furthermore, it should be understood that the order of steps or order for performing certain actions is immaterial so long as the invention remains operable. Moreover, two or more steps or actions can be conducted simultaneously.

In the specification, the singular forms also include the plural forms, unless the context clearly dictates otherwise. Unless defined otherwise, all technical and scientific terms used herein have the same meaning as commonly understood by one of ordinary skill in the art to which this invention belongs. In the case of conflict, the present specification will control. Furthermore, it should be recognized that in certain instances a composition can be described as being composed of the components prior to mixing, or prior to a further processing step such as drying, binder removal, heating, sintering, etc. It is recognized that certain components can further react or be transformed into new materials.

All percentages and ratios used herein are on a volume (volume/volume) or weight (weight/weight) basis as shown, or otherwise indicated.

What is claimed is:

1. A complex according to Formula VIII, selected individually or in any mixture:

VIII $$[R^1 \sim CR^2{=}CR^3{-}E{-}X{-}E{-}CR^4{=}CR^5 \sim R^6]_m[Pt]_n[L]_p$$

wherein:

the ligand $[R^1 \sim CR^2{=}CR^3\text{-}E\text{-}X\text{-}E\text{-}CR^4{=}CR^5 \sim R^6]$ is dienic, $R^1$ and $R^6$ are independently an alkyl or aryl group, or H if $CR^2{=}CR^3$ or $CR^4{=}CR^5$ is part of a cyclic structure such as a cyclic monoolefin;

$R^2$, $R^3$, $R^4$, and $R^5$ are independently H, an alkyl group, or an aryl group, or $R^2$ and $R^3$ and/or $R^4$ and $R^5$ taken together form part of a cyclic monoolefin;

both occurrences of E are either $SiR^{13}R^{14}$ where $R^{13}$ and $R^{14}$ are independently alkyl or aryl, or $CR^{15}R^{16}$ where $R^{15}$ and $R^{16}$ are independently H, alkyl or aryl;

X is selected from oxygen (O) and nitrogen (N), preferably oxygen, or X is a divalent hydrocarbyl group;

L is a monodentate or bidentate neutral ligand selected from organophosphines or CO, and p=0-1;

wherein, if p=1, the ratio m:n is 1:1;

wherein, if p=0, the ratio m:n is from 2:1 to 3:2;

wherein each said alkyl or aryl group either within the internal alkenyl group or on the organophosphine independently contains 1-20 carbon atoms;

wherein said alkyl or aryl group optionally and independently contains heteroatoms selected from N, O, P, Si, S; and wherein said alkyl or aryl group optionally and independently is substituted with halogen.

2. A complex according to Formula VIII, selected individually or in any mixture:

VIII $$[R^1 \sim CR^2{=}CR^3{-}E{-}X{-}E{-}CR^4{=}CR^5 \sim R^6]_m[Pt]_n[L]_p$$

wherein:

the ligand $[R^1 \sim CR^2{=}CR^3\text{-}E\text{-}X\text{-}E\text{-}CR^4{=}CR^5 \sim R^6]$ is dienic, $R^1$ and $R^6$ are independently an alkyl or aryl group, or H if $CR^2{-}CR^3$ or $CR^4{=}CR^5$ is part of a cyclic monoolefin;

$R^2$, $R^3$, $R^4$, and $R^5$ are independently H, an alkyl group, or an aryl group, or $R^2$ and $R^3$ and/or $R^4$ and $R^5$ taken together form part of a cyclic monoolefin structure;

both occurrences of E are either $SiR^{13}R^{14}$ where $R^{13}$ and $R^{14}$ are independently alkyl or aryl, or $CR^{15}R^{16}$ where $R^{15}$ and $R^{16}$ are independently H, alkyl or aryl;

X is selected from oxygen (O) and nitrogen (N), or X is a divalent hydrocarbyl group;

L is a monodentate or bidentate neutral ligand selected from organophosphines, organophosphine oxides, CO, internal monoolefins, cyclodienes, or 2-methyl-1,4-naphthoquinone, and p=0-1;

wherein, if p=1, the ratio m:n is 1:1;

wherein, if p=0, the ratio m:n is from 2:1 to 3:2;

wherein each said alkyl or aryl group either within the internal alkenyl group or on the organophosphine or organophosphine oxide independently contains 1-20 carbon atoms;

wherein said alkyl or aryl group optionally and independently contains heteroatoms selected from N, O, P, Si, S; and wherein said alkyl or aryl group optionally and independently is substituted with halogen.

3. The complex according to claim 1 that is an in-situ complex wherein a Pt atom of the complex is coordinated to one or both internal olefin groups of the dienic ligand $[R^1 \sim CR^2{=}CR^3\text{-}E\text{-}X\text{-}E\text{-}CR^4{=}CR^5 \sim R^6]$.

4. The complex according to claim 2 that is an in-situ complex wherein a Pt atom of the complex is coordinated to one or both internal olefin groups of the dienic ligand $[R^1 \sim CR^2{=}CR^3\text{-}E\text{-}X\text{-}E\text{-}CR^4{=}CR^5 \sim R^6]$.

5. The complex according to claim 1 wherein X is oxygen (O).

6. The complex according to claim 1, wherein X is a divalent hydrocarbyl group and the divalent hydrocarbyl group is $-CH_2-$.

7. The complex according to claim 1, wherein the organophosphine is a triorganophosphine.

8. The complex according to claim 7 wherein the triorganophosphine is a triarylphosphine.

9. The complex according to claim 1, wherein p=0, and the ratio m:n is 3:2, or wherein p=1, and the ratio m:n is 1:1.

10. The complex according to claim 2 wherein X is oxygen (O).

11. The complex according to claim 2, wherein X is a divalent hydrocarbyl group and the divalent hydrocarbyl group is $-CH_2-$.

12. The complex according to claim 2, wherein the organophosphine is a triorganophosphine.

13. The complex according to claim 12 wherein the triorganophosphine is a triarylphosphine.

14. The complex according to claim 2, wherein p=0, and the ratio m:n is 3:2, or wherein p=1, and the ratio m:n is 1:1.

15. The complex according to claim 2 wherein the internal monoolefin is 2 butene, dimethyl maleate, dimethyl fumarate, diallyl maleate, fumaronitrile, tetracyanoethylene, or maleic anhydride.

16. The complex according to claim 2, wherein the cyclodiene is 1,5-cyclooctadiene.

17. A process for hydrosilylation of unsaturated compounds, comprising:

reacting a silyl or siloxy hydride with an unsaturated compound having one or more unsaturations in a reaction mixture comprising a complex according to claim 1, wherein the one or more unsaturations are, independently, a double bond or triple bond.

18. The process according to claim 17, wherein the reaction is conducted under one or more conditions of:

(a) the concentration of Pt in the reaction mixture is between 0.1-100 ppm by weight;

(b) the reaction is conducted at a temperature is between −50° C. to 250° C.;

(c) the reaction is conducted neat or the reaction mixture further comprises a solvent selected from a hydrocarbon, a halogenated hydrocarbon, an ether, an alcohol, or a combination of two or more thereof;

(d) the reaction is conducted under ambient, sub-ambient or super-ambient pressure;

(e) the reaction mixture further comprises a cure inhibitor; and (f) the reaction mixture comprises excess of the dienic ligand $[R^1 \cdot CR^2{=}CR^3\text{-E-X-E-}CR^4{=}CR^5 \cdot R^6]$ such that the dienic ligand to platinum ratio in the reaction mixture is less than or equal to 1000:1.

19. A process for hydrosilylation of unsaturated compounds, comprising:

reacting a silyl or siloxy hydride with an unsaturated compound having one or more unsaturations in a reaction mixture comprising a complex according to claim 2, wherein the one or more unsaturations are, independently, a double bond or triple bond.

20. The process according to claim 18, wherein the reaction is conducted under one or more conditions of:

(a) the concentration of Pt in the reaction mixture is between 0.1-100 ppm by weight;

(b) the reaction is conducted at a temperature is between −50° C. to 250° C.;

(c) the reaction is conducted neat or the reaction mixture further comprises a solvent selected from a hydrocarbon, a halogenated hydrocarbon, an ether, an alcohol, or a combination of two or more thereof; and (d) the reaction is conducted under ambient, sub-ambient or super-ambient pressure;

(e) the reaction mixture further comprises a cure inhibitor; and (f) the reaction mixture comprises excess of the dienic ligand $[R^1 \cdot CR^2{=}CR^3\text{-E-X-E-}CR^4{=}CR^5 \cdot R^6]$ such that the dienic ligand to platinum ratio in the reaction mixture is less than or equal to 1000:1.

21. A process for hydrosilylation of unsaturated compounds, comprising:

reacting a silyl or siloxy hydride with an unsaturated compound having one or more unsaturations in a reaction mixture comprising a complex according to claim 3, wherein the one or more unsaturations are, independently, a double bond or triple bond.

22. The process according to claim 21, wherein the reaction is conducted under one or more conditions of:

(a) the concentration of Pt in the reaction mixture is between 0.1-100 ppm by weight;

(b) the reaction is conducted at a temperature is between −50° C. to 250° C.;

(c) the reaction is conducted neat or the reaction mixture further comprises a solvent selected from a hydrocarbon, a halogenated hydrocarbon, an ether, an alcohol, or a combination of two or more thereof;

(d) the reaction is conducted under ambient, sub-ambient or super-ambient pressure;

(e) the reaction mixture further comprises a cure inhibitor; and (f) the reaction mixture comprises excess of the dienic ligand $[R^1 \cdot CR^2{=}CR^3\text{-E-X-E-}CR^4{=}CR^5 \cdot R^6]$ such that the dienic ligand to platinum ratio in the reaction mixture is less than or equal to 1000:1.

23. A process for hydrosilylation of unsaturated compounds, comprising:

reacting a silyl or siloxy hydride with an unsaturated compound having one or more unsaturations in a reaction mixture comprising a complex according to claim 4, wherein the one or more unsaturations are, independently, a double bond or triple bond.

24. The process according to claim 23, wherein the reaction is conducted under one or more conditions of:

(a) the concentration of Pt in the reaction mixture is between 0.1-100 ppm by weight;

(b) the reaction is conducted at a temperature is between −50° C. to 250° C.;

(c) the reaction is conducted neat or the reaction mixture further comprises a solvent selected from a hydrocarbon, a halogenated hydrocarbon, an ether, an alcohol, or a combination of two or more thereof; and (d) the reaction is conducted under ambient, sub-ambient or super-ambient pressure;

(e) the reaction mixture further comprises a cure inhibitor; and (f) the reaction mixture comprises excess of the dienic ligand $[R^1 \cdot CR^2{=}CR^3\text{-E-X-E-}CR^4{=}CR^5 \cdot R^6]$ such that the dienic ligand to platinum ratio in the reaction mixture is less than or equal to 1000:1.

* * * * *